US010424218B2

(12) United States Patent
Furuta et al.

(10) Patent No.: US 10,424,218 B2
(45) Date of Patent: Sep. 24, 2019

(54) STORAGE MEDIUM HAVING STORED THEREON RESPIRATORY INSTRUCTION PROGRAM, RESPIRATORY INSTRUCTION APPARATUS, RESPIRATORY INSTRUCTION SYSTEM, AND RESPIRATORY INSTRUCTION PROCESSING METHOD

(75) Inventors: Norikatsu Furuta, Kyoto (JP); Makoto Yoshizawa, Sendai (JP); Tomoyuki Yambe, Sendai (JP); Norihiro Sugita, Sendai (JP)

(73) Assignees: NINTENDO CO., LTD., Kyoto (JP); TOHOKU UNIVERSITY, Sendai-Shi, Miyagi (JP)

( * ) Notice: Subject to any disclaimer, the term of this patent is extended or adjusted under 35 U.S.C. 154(b) by 653 days.

(21) Appl. No.: 12/856,865

(22) Filed: Aug. 16, 2010

(65) Prior Publication Data
US 2011/0306024 A1 Dec. 15, 2011

(30) Foreign Application Priority Data
Jun. 10, 2010 (JP) .................. 2010-133425

(51) Int. Cl.
G09B 19/00 (2006.01)
G09B 5/04 (2006.01)
(52) U.S. Cl.
CPC .............. *G09B 19/00* (2013.01); *G09B 5/04* (2013.01); *A63F 2300/1012* (2013.01); *A63F 2300/638* (2013.01); *A63F 2300/66* (2013.01); *A63F 2300/8094* (2013.01)

(58) Field of Classification Search
CPC ... G09B 19/00; G09B 5/04; A63F 2300/1012; A63F 2300/638; A63F 2300/66; A63F 2300/8094
USPC ....................................... 434/258
See application file for complete search history.

(56) References Cited

U.S. PATENT DOCUMENTS 6,067,085 A * 5/2000 Modh et al. .................. 715/711

OTHER PUBLICATIONS

BarthaxDravtore, 'Wii Fit, Yoga, Deep Breathing, Nintendo Wii' Jan. 7, 2009. www.youtube.com [online], [retrieved on Aug. 23, 2012]. Retrieved from the Internet <URL: http://www.youtube.com/watch?v=lh-lCrhkrjY>(Youtube).*

(Continued)

Primary Examiner — Robert P Bullington
(74) Attorney, Agent, or Firm — Nixon & Vanderhye P.C.

(57) ABSTRACT

At least an expiratory period during which a user is instructed to take an expiratory action as a respiratory action and an inspiratory period during which the user is instructed to take an inspiratory action as the respiratory action are set. One of enlargement and reduction of a first object is performed during the expiratory period, and the other of the enlargement and the reduction of the first object is performed during the inspiratory period, the first object representing a loop path. During the expiratory period, a second object is caused to move along and complete one full circuit of the path in a time from a beginning to an end of the expiratory period, and during the inspiratory period, the second object is caused to move along and complete one full circuit of the path in a time from a beginning to an end of the inspiratory period.

19 Claims, 15 Drawing Sheets

(56) References Cited

OTHER PUBLICATIONS jennibagus, 'Breathing Exercise (Pranayama)—Arrested and Resting Breath' Jun. 25, 2006. www.abc-of-yoga.com [online], [retrieved on Aug. 23, 2012]. Retrieved from the Internet <URL: http://www.abc-of-yoga.com/pranayama/arrested.asp>(abc-of-yoga).*

Dean Takahashi, 'Nintendo CEO: Wii care about your heartbeat, but not your iPhone, the recession or free games' Jun. 4, 2009. venturebeat.com [online], [retrieved on Aug. 23, 2012]. Retrieved from the Internet<URL:http://venturebeat.com/2009/06/04/nintendo-ceo-wii-care-about-your-heartbeat-but-not-your-iphone-the-recession-or-free-games/>(venturebeat).*

'Wii Fit: Breathing Exercise' Apr. 28, 2008. videogamer.com [online], [retrieved on Jun. 15, 2013]. Retrieved from the Internet <URL: http://www.videogamer.com/videos/wii_fit_breathing_exercise.html>.*

* cited by examiner

F I G. 2
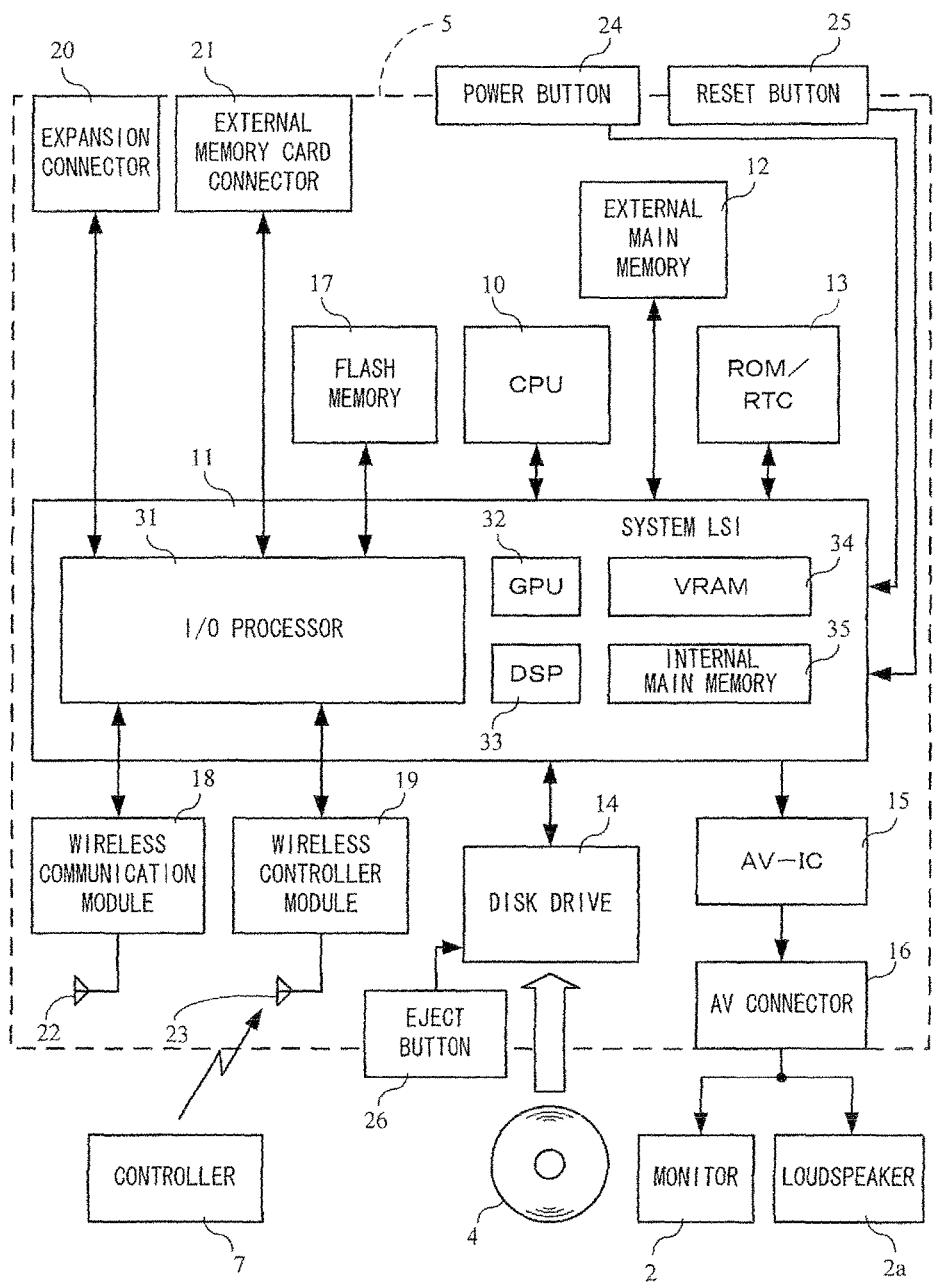

F I G. 7
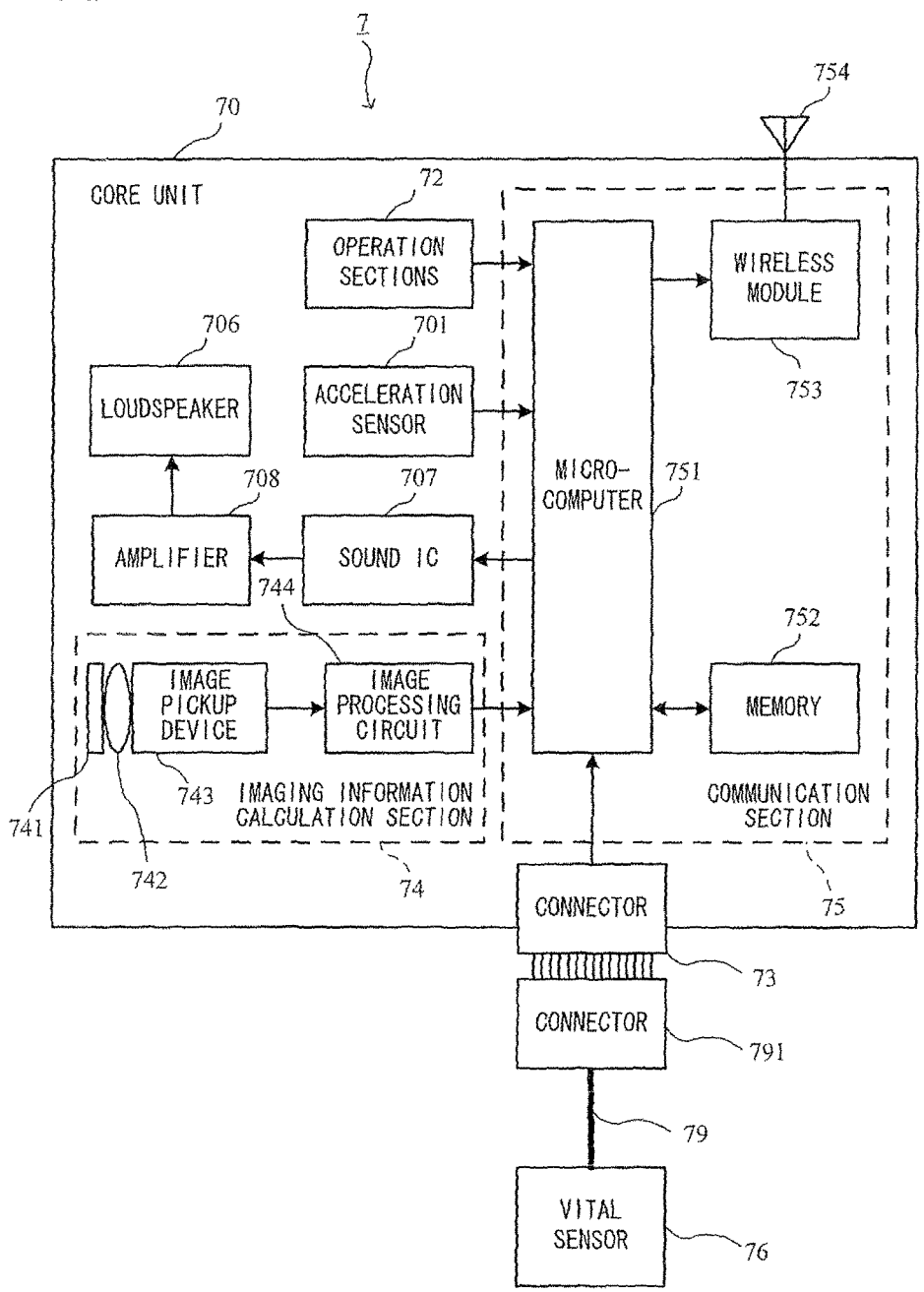

STORAGE MEDIUM HAVING STORED THEREON RESPIRATORY INSTRUCTION PROGRAM, RESPIRATORY INSTRUCTION APPARATUS, RESPIRATORY INSTRUCTION SYSTEM, AND RESPIRATORY INSTRUCTION PROCESSING METHOD

CROSS REFERENCE TO RELATED APPLICATION

The disclosure of Japanese Patent Application No. 2010-133425, filed Jun. 10, 2010, is incorporated herein by reference.

BACKGROUND OF THE INVENTION

Field of the Invention

The present invention relates to a storage medium having stored thereon a respiratory instruction program, a respiratory instruction apparatus, a respiratory instruction system, and a respiratory instruction processing method, and in particular, relates to a storage medium having stored thereon a respiratory instruction program, a respiratory instruction apparatus, a respiratory instruction system, and a respiratory instruction processing method that instruct a user to regulate the timing of the user's breathing.

Description of the Background Art

Conventionally, as described in "Wagaya De Kenkou! Wii Fit Official Tettei Katsuyou Book", edited by Eiji Odagiri, Shufu To Seikatsu Sha Co., Ltd., p. 18 (hereinafter referred to as "Non-patent Document 1"), there is a game apparatus that, based on the size of a displayed circle, instructs a user to regulate the timing of the user's breathing. For example, a game apparatus described in Non-patent Document 1 prompts a user to take an inspiratory action by displaying a circle by gradually reducing the circle, and prompts the user to take an expiratory action by displaying the circle by gradually enlarging the circle.

However, the game apparatus described in Non-patent Document 1 represents, only by a change such as enlargement/reduction of the circle, the time when the user takes an expiratory action or an inspiratory action. Thus, at a particular time, the user cannot recognize how much longer they are to breathe in or breathe out, and therefore may not smoothly repeat respiratory actions, because of losing control of their breathing at the time when the inspiratory action switches to the expiratory action, or having excess breath at the time when the expiratory action switches to the inspiratory action.

SUMMARY OF THE INVENTION

Therefore it is an object of the present invention to provide a storage medium having stored thereon a respiratory instruction program, a respiratory instruction apparatus, a respiratory instruction system, and a respiratory instruction processing method that make it possible to easily recognize at least the period during which an expiratory action and/or an inspiratory action is prompted.

To achieve the above object, the present invention has the following features.

A first aspect of the present invention is a computer-readable storage medium having stored thereon a respiratory instruction program executed by a computer of a respiratory instruction apparatus that instructs a user to take a respiratory action, the respiratory instruction program causing the computer to function as period setting means, first object enlarging/reducing means, second object moving means, and object display means. The period setting means sets at least an expiratory period during which the user is instructed to take an expiratory action as the respiratory action, and an inspiratory period during which the user is instructed to take an inspiratory action as the respiratory action. The first object enlarging/reducing means performs one of enlargement of a first object and reduction of the first object during the expiratory period, and performs the other of the enlargement of the first object and the reduction of the first object during the inspiratory period, the first object representing a loop path. The second object moving means, during the expiratory period, causes a second object to move along and complete one full circuit of the path in a time from a beginning to an end of the expiratory period, and during the inspiratory period, causes the second object to move along and complete one full circuit of the path in a time from a beginning to an end of the inspiratory period. The object display means displays the first object and the second object on a display device.

Based on the above, by the change such as the enlargement or the reduction of the first object and by the position of the second object moving around along the path of the first object, it is possible to easily recognize the period during which the user is prompted to take an expiratory action and/or an inspiratory action.

The respiratory instruction program may further cause the computer to function as first object display form setting means. The first object display form setting means sets, to different display forms, the path along which the second object moves during the expiratory period and the path along which the second object moves during the inspiratory period. In this case, the object display means may display the first object on the display device in accordance with the display forms set by the first object display form setting means.

The first object display form setting means may set, to different colors, the path along which the second object moves during the expiratory period and the path along which the second object moves during the inspiratory period.

The first object display form setting means may set, to different line types, the path along which the second object moves during the expiratory period and the path along which the second object moves during the inspiratory period.

Based on the above, by the display form of the path in the forward direction of the movement of the second object, it is possible to understand the lengths of the expiratory period and the inspiratory period that are scheduled and the time when the periods switch, and therefore it is possible to prepare in advance for the respiratory action.

The first object display form setting means may set, in the loop path, a display form of a part passed by the second object, by sequentially changing the display form of the part to a display form corresponding to the respiratory action that the user is to be instructed to take when the second object moves along the passed part in a subsequent circuit.

Based on the above, it is possible to understand the breakdown of the expiratory period and the inspiratory period that will arrive when the second object moves along the loop path in the subsequent circuit, and therefore it is possible to prepare in advance for the respiratory action. Further, the periods (e.g., the expiratory period and the inspiratory period) indicating respiratory actions switch every time the second object completes one full circuit of the path, and therefore it is possible to use, in the path, the part which has been passed by the second object and whose display form has thereby changed, as an indicator of the time elapsed (elapsed portion) during the expiratory period or the inspiratory period that an instruction is being given to follow at the present time.

The respiratory instruction program may further cause the computer to function as sign providing means. The sign providing means provides, on the loop path, a predetermined sign to a position that is a boundary between the path along which the second object moves during the expiratory period and the path along which the second object moves during the inspiratory period. In this case, the object display means may display on the display device the first object to which the sign is provided.

Based on the above, by the sign provided to the path in the forward direction of the movement of the second object, it is possible to understand the lengths of the expiratory period and the inspiratory period that are scheduled and the time when the periods switch, and therefore it is possible to prepare in advance for the respiratory action.

The respiratory instruction program may further cause the computer to function as second object display form setting means. The second object display form setting means sets, to different display forms, the second object displayed during the expiratory period and the second object displayed during the inspiratory period. In this case, the object display means may display the second object on the display device in accordance with the display forms set by the second object display form setting means.

The second object display form setting means may set, to different colors, the second object displayed during the expiratory period and the second object displayed during the inspiratory period.

The second object display form setting means may set the second object displayed during the expiratory period to a breathing-out expression, and sets the second object displayed during the inspiratory period to a breathing-in expression.

Based on the above, when the display form of the second object is changed in accordance with the respiratory action that the user is instructed to take, it is possible, with increased ease, to recognize the respiratory action that the user is instructed to take.

The respiratory instruction program may further cause the computer to function as second object enlarging/reducing means. The second object enlarging/reducing means performs one of enlargement of the second object and reduction of the second object during the expiratory period, and performs the other of the enlargement of the second object and the reduction of the second object during the inspiratory period.

Based on the above, when the second object is displayed by enlarging or reducing also the second object in accordance with the respiratory action that the user is instructed to take, it is possible, with increase ease, to recognize the respiratory action that the user is instructed to take.

The respiratory instruction program may further cause the computer to function as biological signal obtaining means and respiratory cycle calculating means. The biological signal obtaining means obtains a biological signal from the user. The respiratory cycle calculating means for calculating a respiratory cycle of the user, using the biological signal obtained by the biological signal obtaining means. In this case, the period setting means may set the expiratory period and the inspiratory period based on the respiratory cycle calculated by the respiratory cycle calculating means.

Based on the above, it is possible to instruct the user to take a respiratory action based on the present respiratory state, instead of instructing the user to take a respiratory action that is fixed based on a predetermined respiratory cycle.

The period setting means may set the expiratory period and the inspiratory period based on a cycle obtained by changing, by a predetermined rate, the respiratory cycle calculated by the respiratory cycle calculating means.

Based on the above, it is possible to prompt the user to gradually slow the respiratory cycle of the user, and to prompt the user to gradually quicken the respiratory cycle of the user.

The second object moving means, during the expiratory period, may cause the second object to move along and complete one full circuit of the path at a constant angular velocity in the time from the beginning to the end of the expiratory period, and during the inspiratory period, may cause the second object to move along and complete one full circuit of the path at a constant angular velocity in the time from the beginning to the end of the inspiratory period.

Based on the above, the second object completes one full circuit of the loop path at a constant angular velocity, and therefore it is possible to easily understand the remaining time of the expiratory period or the inspiratory period that an instruction is being given to follow at the present time, and to easily understand the time when the periods switch.

The first object enlarging/reducing means may perform one of the enlargement of the first object and the reduction of the first object during the expiratory period such that a size of the first object changes based on a sine curve, and may perform the other of the enlargement of the first object and the reduction of the first object during the inspiratory period such that the size of the first object changes based on a sine curve.

Based on the above, when the first object is enlarged or reduced based on a sine curve, it is possible to cause the user to imagine the expansion and contraction of the lungs of a human body, the expansion and contraction of a balloon when blown up, or the like.

The period setting means may further set a breath-hold period during which the user is instructed to take a breath-hold action as the respiratory action. The first object enlarging/reducing means may maintain a size of the first object constant during the breath-hold period. The second object moving means, during the breath-hold period, may cause the second object to move along and complete one full circuit of the path in a time from a beginning to an end of the breath-hold period.

Based on the above, it is possible to further instruct the user to take a breath-hold action, in which a respiratory action is temporarily stopped, and it is also possible to easily recognize the period during which the user is prompted to take the breath-hold action.

The first object may represent a circular path. In this case, the first object enlarging/reducing means may perform the enlargement or the reduction of the first object by enlarging or reducing the path such that a diameter of the circle is increased or decreased, respectively.

Based on the above, the second object moves along a path in the shape of a circle, and therefore it is possible to easily understand the remaining time of the expiratory period or the inspiratory period that an instruction is being given to follow at the present time, and to easily understand the time when the periods switch.

A second aspect, a third aspect, and a fourth aspect of the present invention may be carried out in the form of a respiratory instruction apparatus and a respiratory instruction system that include the above means, and may be carried out in the form of a respiratory instruction processing method including steps performed by the above means.

Based on the present invention, by the change such as the enlargement or the reduction of the first object and by the position of the second object moving around along the path of the first object, it is possible to easily recognize the period during which the user is prompted to take an expiratory action and/or an inspiratory action.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing an example of a game apparatus body 5 of FIG. 1;

FIG. 7 is a block diagram showing an example of the internal configuration of the core unit 70 of FIG. 3;

DESCRIPTION OF THE PREFERRED EMBODIMENTS

Figure 1:
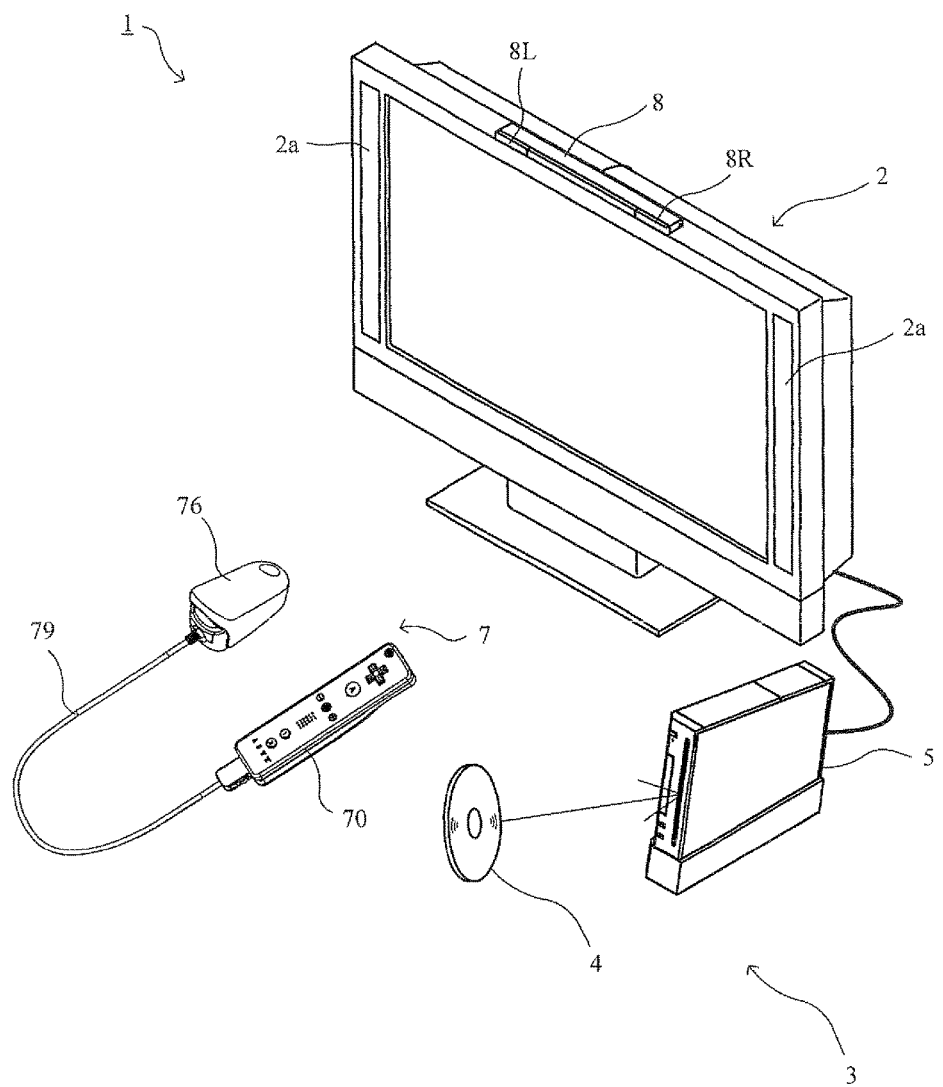
FIG. 1 is an external view of an example of a game system 1 according to an embodiment of the present invention.

With reference to FIG. 1, a description is given of an apparatus for executing a respiratory instruction program according to an embodiment of the present invention. Hereinafter, in order to give specific descriptions, a game system including a stationary game apparatus body 5 is used, the stationary game apparatus body 5 being an example of the above apparatus. Note that FIG. 1 is an external view of an example of a game system 1 including a stationary game apparatus 3. FIG. 2 is a block diagram showing an example of the game apparatus body 5. The game system 1 is described below.

As shown in FIG. 1, the game system 1 includes: a household television 2 (hereinafter referred to as a "monitor 2") that is an example of display means; and the stationary game apparatus 3 connected to the monitor 2 via a connection cord. The monitor 2 includes loudspeakers 2a for outputting, in the form of sound, an audio signal output from the game apparatus 3. The game apparatus 3 includes: an optical disk 4 having stored thereon the respiratory instruction program; the game apparatus body 5 having a computer for executing the respiratory instruction program of the optical disk 4 to thereby output a respiratory instruction screen to the monitor 2 for display; and a controller 7 for providing the game apparatus body 5 with operation information necessary for a game where a character or the like displayed on the monitor 2 is controlled.

The game apparatus body 5 includes a wireless controller module 19 (see FIG. 2). The wireless controller module 19 receives data wirelessly transmitted from the controller 7, and transmits data from the game apparatus body 5 to the controller 7. The wireless controller module 19 thus connects the controller 7 and the game apparatus body 5 by wireless communication. Further, the optical disk 4 is detachably mounted on the game apparatus body 5, the optical disk 4 being an example of an information storage medium exchangeable in the game apparatus body 5.

On the game apparatus body 5, a flash memory 17 (see FIG. 2) is mounted. The flash memory 17 functions as a backup memory for fixedly storing therein data such as save data. The game apparatus body 5 executes the respiratory instruction program, a game program, and the like stored on the optical disk 4, to thereby display the result of the execution as a respiratory instruction image, a game image, and the like, respectively, on the monitor 2. The respiratory instruction program, the game program, and the like to be executed may be stored in advance not only on the optical disk 4 but also in the flash memory 17. The game apparatus body 5 may reproduce the state of a game played in the past, using the save data stored in the flash memory 17, and display an image of the reproduced game state on the monitor 2. A user of the game apparatus 3 is prompted to take their own respiratory action while viewing the respiratory instruction image displayed on the monitor 2, and therefore can enjoy the progression of the game by operating the controller 7 while viewing the game image displayed on the monitor 2.

Using the technology of, for example, Bluetooth (registered trademark), the controller 7 wirelessly transmits transmission data, such as operation information and a biological signal, to the game apparatus body 5 including the wireless controller module 19. The controller 7 includes a core unit 70 and a vital sensor 76. The core unit 70 and the vital sensor 76 are connected to each other via a flexible connection cable 79. The core unit 70 is control means mainly for controlling an object or the like displayed on a display screen of the monitor 2. The vital sensor 76 is attached to the user's body (e.g., to the user's finger). The vital sensor 76 obtains a biological signal from the user, and sends the biological signal to the core unit 70 via the connection cable 79. The core unit 70 includes: a housing that is small enough to be held with one hand; and a plurality of operation buttons (including a cross key, a stick, and the like) that are exposed on the surface of the housing. As will be described in detail later, the core unit 70 includes an imaging information calculation section 74 for capturing an image viewed from the core unit 70. As an example of imaging targets of the imaging information calculation section 74, two LED modules 8L and 8R (hereinafter referred to as "markers 8L and 8R") are provided in the vicinity of the display screen of the monitor 2. These markers 8L and 8R each output, for example, infrared light forward from the monitor 2. The controller 7 (e.g., the core unit 70) is also capable of receiving, via a communication section 75, transmission data wirelessly transmitted from the wireless controller module 19 of the game apparatus body 5, and generating a sound or vibration based on the transmission data.

Note that in the present embodiment, the core unit 70 and the vital sensor 76 are connected to each other via the flexible connection cable 79. The connection cable 79, however, can be eliminated by mounting a wireless unit on the vital sensor 76. For example, the mounting of a Bluetooth (registered trademark) unit on the vital sensor 76 as a wireless unit enables the transmission of the biological signal from the vital sensor 76 to the core unit 70 or to the game apparatus body 5. Further, the core unit 70 and the vital sensor 76 may be integrated by fixing the vital sensor 76 to the core unit 70. In this case, the user can use the vital sensor 76 integrated with the core unit 70.

Next, with reference to FIG. 2, a description is given of the internal configuration of the game apparatus body 5. FIG. 2 is a block diagram showing the internal configuration of the game apparatus body 5. The game apparatus body 5 includes a central processing unit (CPU) 10, a system large scale integration (system LSI) 11, an external main memory 12, a read only memory/real time clock (ROM/RTC) 13, a disk drive 14, an audio video-integrated circuit (AV-IC) 15, and the like.

The CPU 10 performs game processing by executing the game program (the respiratory instruction program) stored on the optical disk 4, and functions as a game processor. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processing such as: controlling data transfer among the components connected to the system LSI 11; generating an image to be displayed; and obtaining data from external devices. Note that the internal configuration of the system LSI 11 will be described later. The external main memory 12, which is a volatile memory, stores therein a program such as the respiratory instruction program and the game program loaded from the optical disk 4, or the respiratory instruction program and the game program loaded from the flash memory 17, and also stores therein various pieces of data. The external main memory 12 is used as a work area or a buffer area of the CPU 10. The ROM/RTC 13 includes a ROM (a so-called boot ROM) incorporating therein a program for starting up the game apparatus body 5, and also includes a clock circuit (RTC) that counts time. The disk drive 14 reads program data, texture data, and the like from the optical disk 4, and writes the read data into an internal main memory 35 described later or into the external main memory 12.

The system LSI 11 includes an input/output processor 31, a graphic processor unit (GPU) 32, a digital signal processor (DSP) 33, a video RAM (VRAM) 34, and the internal main memory 35. Although not shown, these components 31 through 35 are connected to each other via an internal bus.

The GPU 32 is a part of drawing means, and generates an image in accordance with a graphics command (command to create an image) from the CPU 10. The VRAM 34 stores therein data (such as polygon data and texture data) that is necessary for the GPU 32 to execute the graphics command. When generating the image, the GPU 32 generates image data, using the data stored in the VRAM 34.

The DSP 33 functions as an audio processor, and generates audio data, using sound data and acoustic waveform (timbre) data stored in the internal main memory 35 and in the external main memory 12.

The image data and the audio data generated as described above are read by the AV-IC 15. The AV-IC 15 outputs the read image data to the monitor 2 via an AV connector 16, and outputs the read audio data to the loudspeakers 2a built in the monitor 2. Consequently, an image is displayed on the monitor 2, and a sound is output from the loudspeakers 2a.

The input/output processor (I/O Processor) 31 transmits/receives data to/from the components connected thereto, and downloads data from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to thereby detect the presence or absence of data that is required to be transmitted to the network. If such data is present, the data is transmitted to the network via the wireless communication module 18 and the antenna 22. The input/output processor 31 also receives, via the network, the antenna 22, and the wireless communication module 18, data transmitted from other game apparatuses or data downloaded from a download server, and stores the received data in the flash memory 17. By executing the respiratory instruction program and the game program, the CPU 10 reads the data stored in the flash memory 17, and uses the read data for the respiratory instruction program and the game program. The flash memory 17 may store therein save data (data stored after or during the game) as a result of playing a game using the game apparatus body 5, as well as the data transmitted and received between the game apparatus body 5 and other game apparatuses or various servers.

The input/output processor 31 receives, via the antenna 23 and the wireless controller module 19, operation data or the like transmitted from the controller 7, and (temporarily) stores the operation data or the like in a buffer area of the internal main memory 35 or of the external main memory 12. Note that, similarly to the external main memory 12, the internal main memory 35 may store therein a program such as the respiratory instruction program and the game program loaded from the optical disk 4, or the respiratory instruction program and the game program loaded from the flash memory 17, and also store therein various pieces of data. The internal main memory 35 may be used as a work area or a buffer area of the CPU 10.

Further, the input/output processor 31 is connected to the expansion connector 20 and the external memory card connector 21. The expansion connector 20 is a connector for an interface such as USB or SCSI. Instead of the wireless communication module 18, the expansion connector 20 is capable of communicating with a network by being connected to a medium such as an external storage medium, to a peripheral device such as another controller, or to a connector for wired communication. The external memory card connector 21 is a connector for connection to an external storage medium such as a memory card. For example, the input/output processor 31 is capable of accessing an external storage medium via the expansion connector 20 or the external memory card connector 21 to thereby store data into or read data from the external storage medium.

The game apparatus body 5 includes (e.g., on the front main surface thereof): a power button 24 of the game apparatus body 5; a reset button 25 for resetting game processing; an insertion slot for detachably mounting the optical disk 4; an eject button 26 for ejecting the optical disk 4 from the insertion slot of the game apparatus body 5; and the like. The power button 24 and the reset button 25 are connected to the system LSI 11. When the power button 24 is turned on, each component of the game apparatus body 5 is supplied with power via an AC adaptor (not shown). When the reset button 25 is pressed, the system LSI 11 re-executes the boot program of the game apparatus body 5. The eject button 26 is connected to the disk drive 14. When the eject button 26 is pressed, the optical disk 4 is ejected from the disk drive 14.

Figure 3:
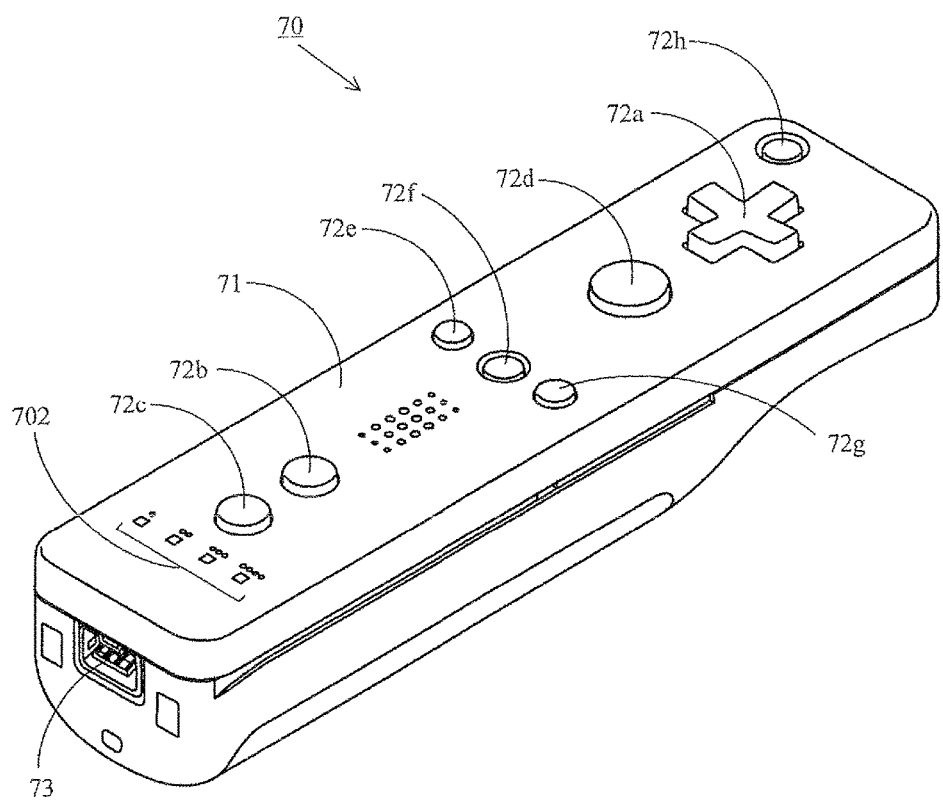
FIG. 3 is a perspective view of an example of a core unit 70 of FIG. 1 viewed from the top rear side thereof.
Figure 4:
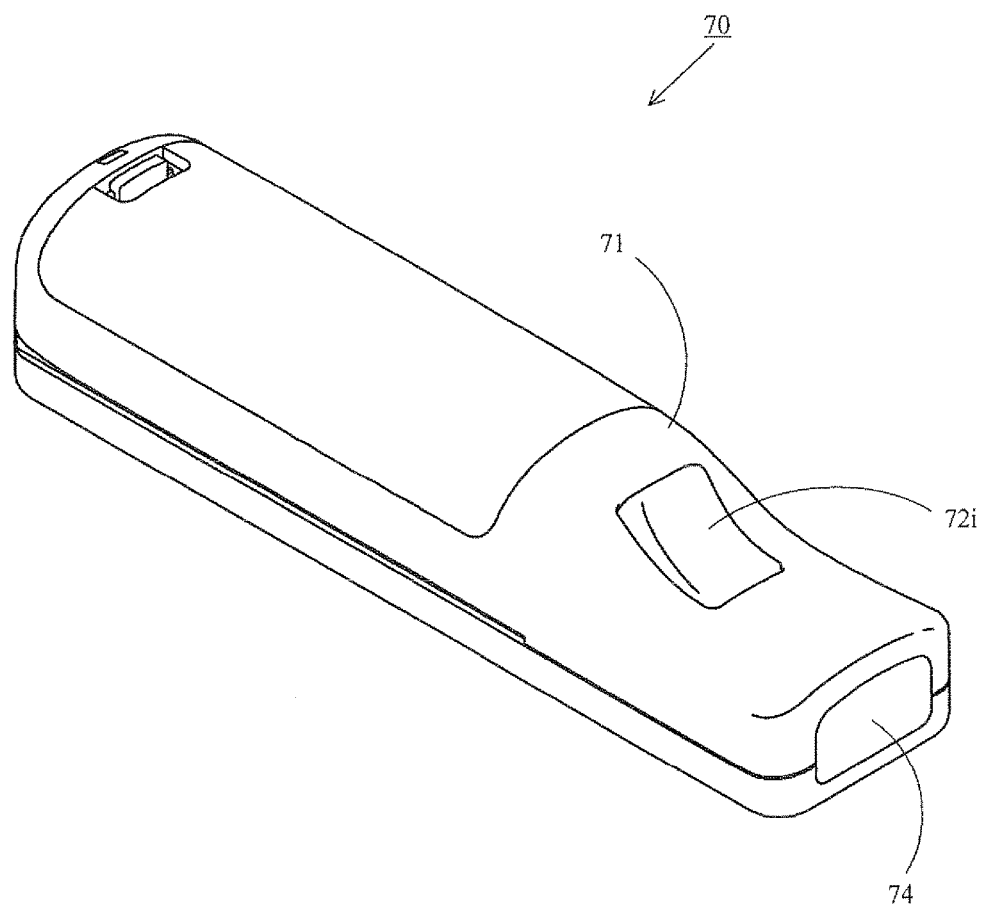
FIG. 4 is a perspective view of an example of the core unit 70 of the FIG. 3 viewed from the bottom front side thereof.

With reference to FIGS. 3 and 4, the core unit 70 is described. Note that FIG. 3 is a perspective view of an example of the core unit 70 viewed from the top rear side thereof. FIG. 4 is a perspective view of an example of the core unit 70 viewed from the bottom front side thereof.

Referring to FIGS. 3 and 4, the core unit 70 includes a housing 71 formed by, for example, plastic molding. The housing 71 has a plurality of operation sections 72 provided thereon. The housing 71 is of a generally parallelepiped shape extending in the longitudinal direction from front to rear. The overall size of the housing 71 is small enough to be held with one hand by an adult or even a child.

At the center of the anterior part of the top surface of the housing 71, a cross key 72a is provided. The cross key 72a is a cross-shaped four-direction push switch. The cross key 72a includes operation portions corresponding to four directions (front, rear, right, and left) placed on the respective projecting portions of the cross shape, the projecting portions arranged at 90 degree intervals. The user selects one of the front, rear, right, and left directions by pressing one of the operation portions of the cross key 72a. Through the operation of the cross key 72a, the user can, for example, instruct a player character or the like appearing in a virtual game world to move in the indicated direction, or give an instruction to select one of multiple options.

Note that the cross key 72a is an operation section for outputting an operation signal in accordance with the direction input operation described above performed by the user. Such an operation section, however, may be provided in another form. For example, an operation section may be provided that has four push switches arranged in a cross formation and outputs an operation signal in accordance with the pressing of one of the push switches by user. Alternatively, an operation section may be provided that has a composite switch including, as well as the above four push switches, a center switch provided at the intersection point of the above cross formation. Yet alternatively, the cross key 72a may be replaced by an operation section that includes an inclinable stick (a so-called joystick) projecting from the top surface of the housing 71 and outputs an operation signal in accordance with the inclining direction of the stick. Yet alternatively, the cross key 72a may be replaced by an operation section that includes a horizontally-slidable disk-shaped member and outputs an operation signal in accordance with the sliding direction of the disk-shaped member. Yet alternatively, the cross key 72a may be replaced by a touch pad.

Posterior to the cross key 72a on the top surface of the housing 71, a plurality of operation buttons 72b through 72g are provided. The operation buttons 72b through 72g are operation sections for, when the user presses the head of each button, outputting an operation signal assigned to the button. For example, the operation buttons 72b through 72d are assigned the functions of a first button, a second button, and an A button, respectively. Further, for example, the operation buttons 72e through 72g are assigned the functions of a minus button, a home button, and a plus button, respectively. These operation buttons 72a through 72g are assigned the respective operation functions in accordance with the game program executed by the game apparatus body 5. Note that in the exemplary arrangement shown in FIG. 3, the operation buttons 72b through 72d are arranged in a line in the front-rear direction, in the center on the top surface of the housing 71. Furthermore, the operation buttons 72e through 72g are arranged in a line in the left-right direction, between the operation buttons 72b and 72d on the top surface of the housing 71. The operation button 72f has the top surface thereof buried in the top surface of the housing 71, so as not to be inadvertently pressed by the user.

Anterior to the cross key 72a on the top surface of the housing 71, an operation button 72h is provided. The operation button 72h is a power switch for remotely turning on/off the game apparatus body 5. The operation button 72h also has the top surface thereof buried in the top surface of the housing 71, so as not to be inadvertently pressed by the user.

Posterior to the operation button 72c on the top surface of the housing 71, a plurality of LEDs 702 are provided. Here, the core unit 70 is assigned a controller type (number) so as to be distinguishable from other controllers. The LEDs 702 are used, for example, to inform the user of the controller type presently set for the core unit 70. Specifically, a signal is transmitted from the wireless controller module 19 to the core unit 70 such that one of the plurality of LEDs 702 that corresponds to the controller type of the core unit 70 is lit on.

On the top surface of the housing 71, sound holes are formed between the operation button 72b and the operation buttons 72e through 72g, so as to output sounds to the outside of the housing 71 from a loudspeaker (a loudspeaker 706 shown in FIG. 5) described later.

On the bottom surface of the housing 71, a recessed portion is formed. The recessed portion on the bottom surface of the housing 71 is formed in the position where the index finger or the middle finger of the user is placed when the user holds the core unit 70 with one hand so as to point the front surface of the housing 71 to the markers 8L and 8R. On a slope surface of the recessed portion, an operation button 72i is provided. The operation button 72i is an operation section that functions as, for example, a B button.

On the front surface of the housing 71, an image pickup device 743 is provided that is a part of the imaging information calculation section 74. Here, the imaging information calculation section 74 is a system for: analyzing image data of an image captured by the core unit 70; discriminating an area having a high brightness in the image; and detecting the position of the center of gravity, the size, and the like of the area. The imaging information calculation section 74 has, for example, a maximum sampling period of approximately 200 frames/sec., and therefore is capable of tracing and analyzing even a relatively fast movement of the core unit 70. A detailed configuration of the imaging information calculation section 74 will be described later. On the rear surface of the housing 71, a connector 73 is provided. The connector 73 is, for example, an edge connector, and is used to engage and connect the core unit 70 with, for example, a connection cable.

Figure 5:
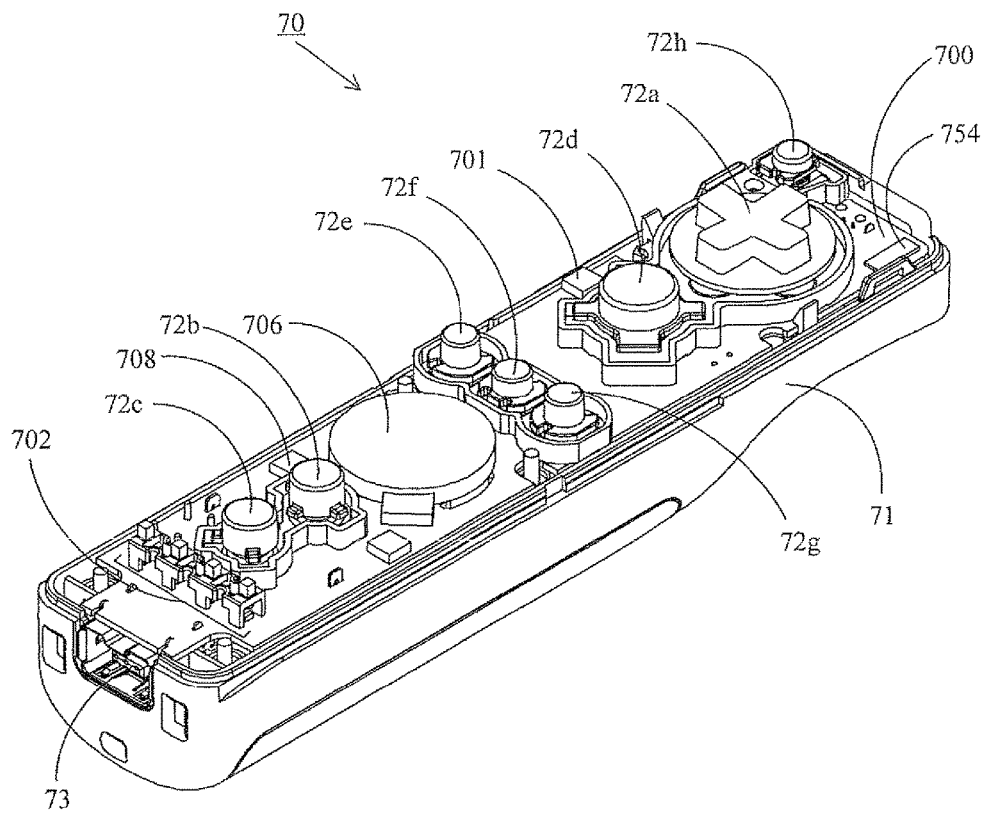
FIG. 5 is a perspective view of an example of the core unit 70 of FIG. 3, with an upper casing thereof removed.
Figure 6:
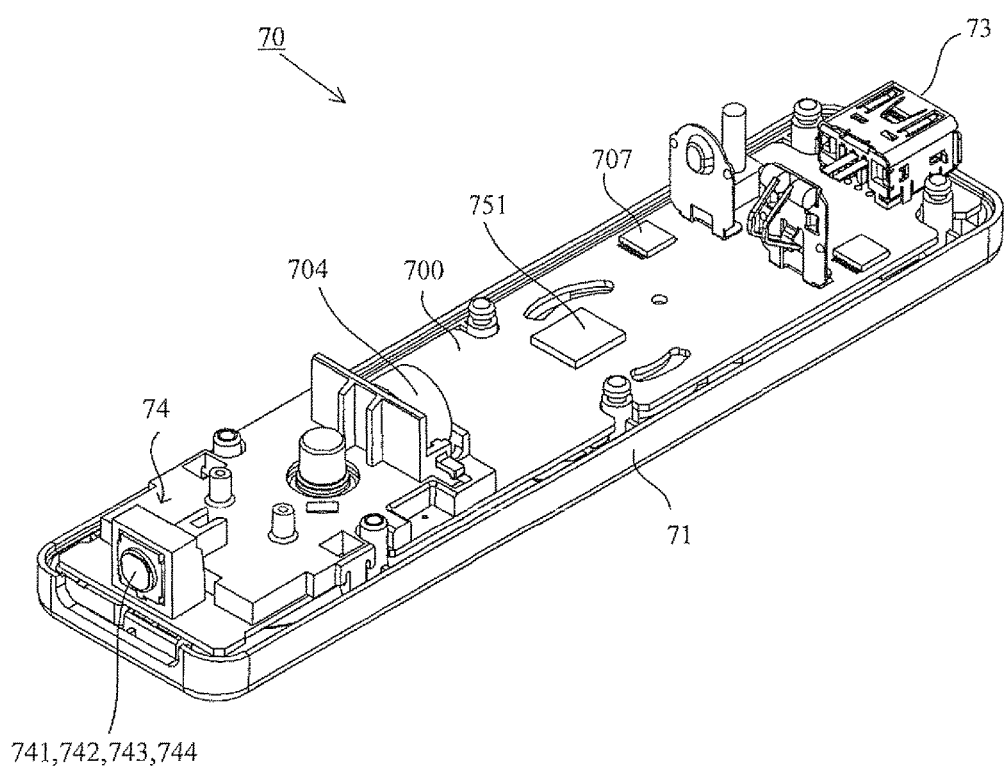
FIG. 6 is a perspective view of an example of the core unit 70 of FIG. 4, with a lower casing thereof removed.

Next, with reference to FIGS. 5 and 6, a description is given of the internal structure of the core unit 70. Note that FIG. 5 is a perspective view of an example of the core unit 70 viewed from the rear surface side thereof, with an upper easing thereof (a part of the housing 71) removed. FIG. 6 is a perspective view of an example of the core unit 70 viewed from the front surface side thereof, with a lower casing thereof (a part of the housing 71) removed. Here, FIG. 6 is a perspective view showing the reverse side of a substrate 700 shown in FIG. 5.

As shown in FIG. 5, the substrate 700 is fixed within the housing 71. On the top main surface of the substrate 700, the operation buttons 72a through 72h, an acceleration sensor 701, the LEDs 702, an antenna 754, and the like are provided. These components are connected to, for example, a microcomputer 751 (see FIGS. 6 and 7) via wires (not shown) formed on the substrate 700 and the like. Further, a wireless module 753 (see FIG. 7) and the antenna 754 allow the core unit 70 to function as a wireless controller. Note that a quartz oscillator (not shown) is provided within the housing 71, and generates a reference clock of the microcomputer 751 described later. Furthermore, on the top main surface of the substrate 700, the loudspeaker 706 and an amplifier 708 are provided. The acceleration sensor 701 is provided on the substrate 700, to the left of the operation button 72d (i.e., provided not in the central part but in the peripheral part of the substrate 700). Accordingly, in accordance with the rotation of the core unit 70 about the axis of the longitudinal direction thereof, the acceleration sensor 701 is capable of detecting, in addition to a change in the direction of the gravitational acceleration, acceleration containing a centrifugal component. Thus, based on the detected acceleration data, the game apparatus body 5 or the like can determine the movement of the core unit 70 by predetermined calculations with excellent sensitivity.

Referring to FIG. 6, at the front edge of the bottom main surface of the substrate 700, the imaging information calculation section 74 is provided. The imaging information calculation section 74 includes an infrared filter 741, a lens 742, the image pickup device 743, and an image processing circuit 744, these components placed in this order starting from the front surface of the core unit 70 and attached to the bottom main surface of the substrate 700. At the rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 via wires formed on the substrate 700 and the like, and outputs an audio signal to the loudspeaker 706 via the amplifier 708 in accordance with sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via wires formed on the substrate 700 and the like, and is turned on/off in accordance with vibration data transmitted from the game apparatus body 5. The core unit 70 is vibrated by the actuation of the vibrator 704, and the vibration is conveyed to the user's hand holding the core unit 70. This makes it possible to achieve a so-called vibration-feedback game. The vibrator 704 is placed slightly anterior to the center of the housing 71, and therefore the housing 71 held by the user significantly vibrates, and allows the user to easily feel the vibration.

Next, with reference to FIG. 7, a description is given of the internal configuration of the controller 7. Note that FIG. 7 is a block diagram showing an example of the internal configuration of the controller 7.

Referring to FIG. 7, the core unit 70 includes the communication section 75, as well as the operation sections 72, the imaging information calculation section 74, the acceleration sensor 701, the vibrator 704, the loudspeaker 706, the sound IC 707, and the amplifier 708 that are described above. The vital sensor 76 is connected to the microcomputer 751 via the connection cable 79, a connector 791, and the connector 73.

The imaging information calculation section 74 includes the infrared filter 741, the lens 742, the image pickup device 743, and the image processing circuit 744. The infrared filter 741 passes only infrared light, among the light incident thereon from the front surface of the core unit 70. The lens 742 collects the infrared light that has passed through the infrared filter 741, and emits the collected infrared light to the image pickup device 743. The image pickup device 743 is a solid-state image pickup device such as a CMOS sensor or a CCD. The image pickup device 743 captures the infrared light collected by the lens 742. That is, the image pickup device 743 captures only the infrared light that has passed through the infrared filter 741, and generates image data of the image. The image data generated by the image pickup device 743 is processed by the image processing circuit 744. Specifically, the image processing circuit 744 processes the image data obtained from the image pickup device 743, and senses an area having a high brightness in the image, and outputs to the communication section 75 the process result data representing the result of the detection of the position coordinates, the square measure, and the like of the area. Note that the imaging information calculation section 74 is fixed to the housing 71 of the core unit 70. This makes it possible to change the imaging direction of the imaging information calculation section 74 by changing the orientation of the housing 71 per se.

The process result data output from the imaging information calculation section 74 can be used as operation data representing, for example, the position pointed to by the core unit 70. For example, the user holds the core unit 70 such that the front surface of the core unit 70 (the side on which the light captured by the imaging information calculation section 74 is incident) faces the monitor 2. In the vicinity of the display screen of the monitor 2, the two markers 8L and 8R are provided. The markers 8L and 8R each emit infrared light forward from the monitor 2, and serve as an imaging target of the imaging information calculation section 74. Thus the game apparatus body 5 calculates the position pointed to by the core unit 70, using position data regarding high-brightness points determined based on the two makers 8L and 8R.

The core unit 70 preferably includes a triaxial acceleration sensor 701. The triaxial acceleration sensor 701 senses linear accelerations in three directions, i.e., the up-down direction, the left-right direction, and the front-rear direction. Alternatively, an accelerometer for sensing a linear acceleration along at least one axis direction may be used. The acceleration sensor 701 may be of the type available from Analog Devices, Inc. or STMicroelectronics N.V. The acceleration sensor 701 is preferably of an electrostatic capacitance (capacitance-coupling) type that is based on silicon micromachined micro electro mechanical systems (silicon micromachined MEMS) technology. However, any other suitable accelerometer technology (e.g., piezoelectric type or piezoresistance type), existing or newly developed, may be used to provide the acceleration sensor 701.

Such accelerometers as used in the acceleration sensor 701 are capable of sensing only an acceleration (linear acceleration) along a straight line corresponding to each axis of the acceleration sensor 701. In other words, the direct output of the acceleration sensor 701 is signals representing linear accelerations (static or dynamic) along the respective three axes of the acceleration sensor 701. Thus the acceleration sensor 701 is incapable of directly sensing physical characteristics such as a movement along a non-linear (e.g., arcuate) path, rotation, a rotational movement, an angular displacement, inclination, a position, and an orientation. As one skilled in the art will readily understand, however, a computer such as a processor (e.g., the CPU 10) of the game apparatus or a processor (e.g., the microcomputer 751) of the controller may perform processing based on the acceleration signals output from the acceleration sensor 701, and therefore it is possible to estimate or calculate (determine) additional information about the core unit 70.

The communication section 75 includes the microcomputer 751, a memory 752, the wireless module 753, and the antenna 754. While using the memory 752 as a storage area during processing, the microcomputer 751 controls the wireless module 753 that wirelessly transmits transmission data. The microcomputer 751 also controls the operations of the sound IC 707 and the vibrator 704 (not shown) in accordance with data received by the wireless module 753 from the game apparatus body 5 via the antenna 754. The sound IC 707 processes sound data or the like transmitted from the game apparatus body 5 via the communication section 75. Further, the microcomputer 751 activates the vibrator 704 in accordance with vibration data or the like (e.g., a signal for turning on/off the vibrator 704) transmitted from the game apparatus body 5 via the communication section 75.

The following are output to the microcomputer 751: operation signals (key data) from the operation sections 72 provided on the core unit 70; acceleration signals (X-axis, Y-axis, and Z-axis direction acceleration data) about the three axial directions from the acceleration sensor 701; and the process result data from the imaging information calculation section 74. Further, the biological signal (biological signal data) from the vital sensor 76 is output to the microcomputer 751 via the connection cable 79. The microcomputer 751 temporarily stores the input data (the key data, the X-axis, Y-axis, and Z-axis direction acceleration data, the process result data, and the biological signal data) in the memory 752 as transmission data to be transmitted to the wireless controller module 19. Here, the wireless transmission from the communication section 75 to the wireless controller module 19 is performed at predetermined time intervals. Game processing is generally performed in a cycle of 1/60 sec., and therefore the wireless transmission needs to be performed in a shorter cycle. Specifically, game processing is performed in a cycle of 16.7 ms (1/60 sec.), and the transmission interval of the communication section 75 configured using the Bluetooth (registered trademark) technology is 5 ms. At the time of performing transmission to the wireless controller module 19, the microcomputer 751 outputs to the wireless module 753 the transmission data, stored in the memory 752, as a series of pieces of operation information. With the use of for example, the Bluetooth (registered trademark) technology, the wireless module 753 modulates the operation information using a carrier wave of a predetermined frequency, and radiates from the antenna 754 a radio signal representing the operation information. That is, the key data from the operation sections 72 provided on the core unit 70, the X-axis, Y-axis, and Z-axis direction acceleration data from the acceleration sensor 701, the process result data from the imaging information calculation section 74, and the biological signal data from the vital sensor 76 are transmitted from the core unit 70. The wireless controller module 19 of the game apparatus body 5 receives the radio signal, and the game apparatus body 5 demodulates and decodes the radio signal to thereby obtain the series of pieces of operation information (the key data, the X-axis, Y-axis, and Z-axis direction acceleration data, the process result data, and the biological signal data). Based on the obtained operation information and the game program, the CPU 10 of the game apparatus body 5 performs game processing. Note that when configured using the Bluetooth (registered trademark) technology, the communication section 75 can also have a function of receiving transmission data wirelessly transmitted from other devices.

Figure 8:
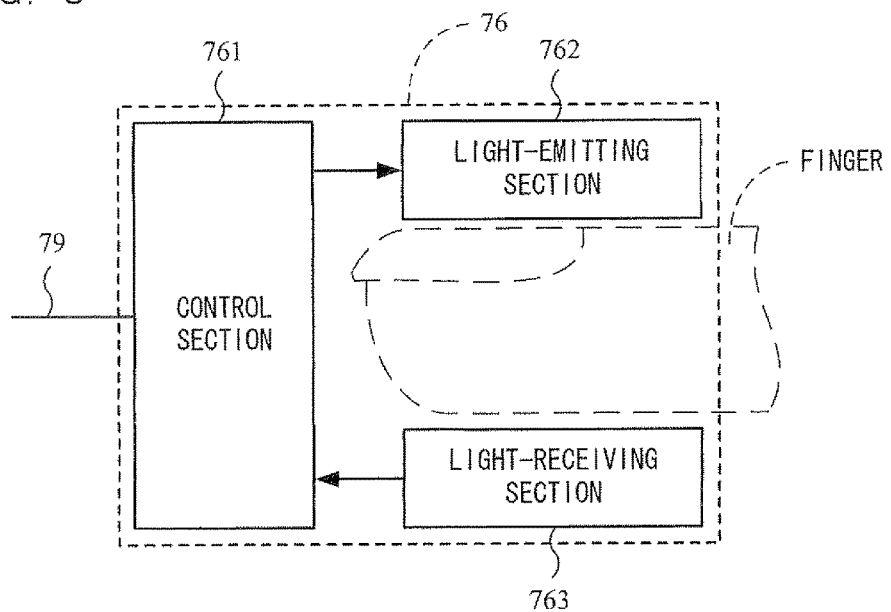
FIG. 8 is a block diagram showing an example of the structure of a vital sensor 76.
Figure 9:
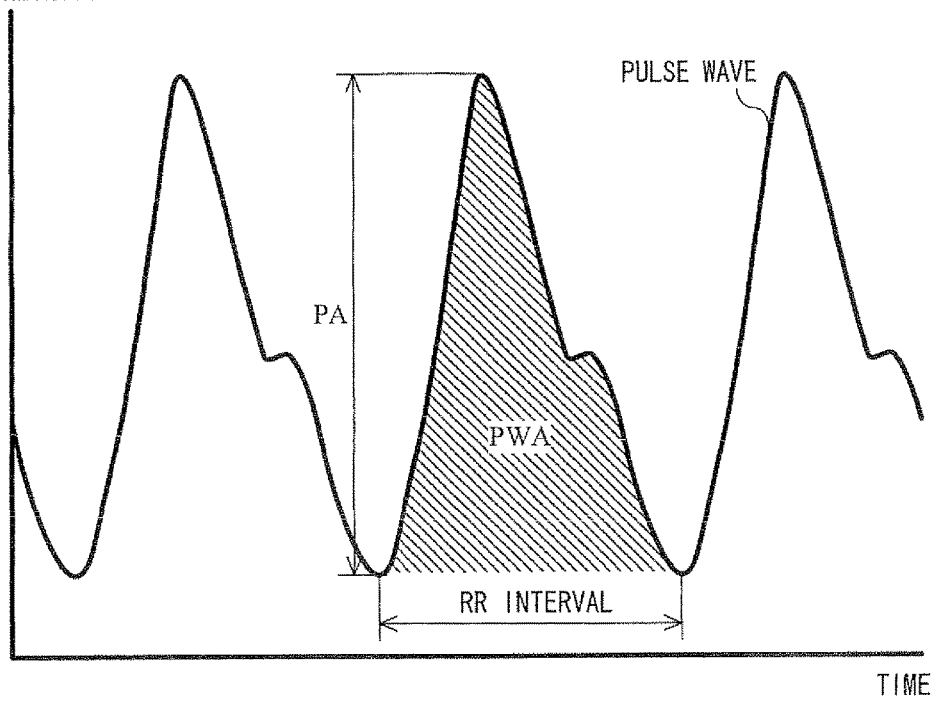
FIG. 9 is a diagram showing a pulse wave signal that is an example of a biological signal output from the vital sensor 76.

Next, with reference to FIGS. 8 and 9, the vital sensor 76 is described. Note that FIG. 8 is a block diagram showing an example of the structure of the vital sensor 76. FIG. 9 is a diagram showing a pulse wave signal that is an example of the biological signal output from the vital sensor 76.

Referring to FIG. 8, the vital sensor 76 includes a control section 761, a light-emitting section 762, and a light-receiving section 763.

The light-emitting section 762 and the light-receiving section 763 constitute a transmission-type digital-plethysmography sensor that is an example of a sensor for obtaining the biological signal of the user. The light-emitting section 762 includes, for example, an infrared LED that emits infrared light of a predetermined wavelength (e.g., 940 nm) toward the light-receiving section 763. The light-receiving section 763 includes, for example, an infrared photoresistor that senses the light emitted by the light-emitting section 762 depending on the wavelength of the emitted light. The light-emitting section 762 and the light-receiving section 763 are arranged so as to face each other with a predetermined gap (hollow space) interposed therebetween.

Here, hemoglobin present in human blood absorbs infrared light. For example, a part (e.g., the fingertip) of the user's body is inserted in the gap between the light-emitting section 762 and the light-receiving section 763. In this case, the infrared light emitted from the light-emitting section 762 is partially absorbed by hemoglobin present in the inserted fingertip before being sensed by the light-receiving section 763. The arteries of the human body pulsate, and therefore the thickness (blood flow rate) of the arteries varies depending on the pulsation. Accordingly, similar pulsation occurs also in the arteries of the inserted fingertip, and the blood flow rate varies depending on the pulsation. Thus the amount of infrared light absorption also varies depending on the blood flow rate. Specifically, when the blood flow rate in the inserted fingertip increases, the amount of light absorbed by hemoglobin also increases, and therefore the amount of infrared light sensed by the light-receiving section 763 relatively decreases. In contrast, when the blood flow rate in the inserted fingertip decreases, the amount of light absorbed by hemoglobin also decreases, and therefore the amount of infrared light sensed by the light-receiving section 763 relatively increases. The light-emitting section 762 and the light-receiving section 763 utilize such an operating principle, i.e., convert the amount of infrared light sensed by the light-receiving section 763 into a photoelectric signal to thereby detect the pulsation (hereinafter referred to as a "pulse wave") of the human body. For example, as shown in FIG. 9, when the blood flow rate in the inserted fingertip increases, the detected value of the light-receiving section 763 (e.g., the photoelectric voltage when the light-receiving section 763 has detected the light) increases, and when the blood flow rate in the inserted fingertip decreases, the detected value of the light-receiving section 763 decreases. Thus a pulse wave portion in which the detected value of the light-receiving section 763 rises and falls is generated as a pulse wave signal. Note that, depending on the circuit configuration of the light-receiving section 763, a pulse wave signal may be generated in which, when the blood flow rate in the inserted fingertip increases, the detected value of the light-receiving section 763 decreases, and when the blood flow rate in the inserted fingertip decreases, the detected value of the light-receiving section 763 increases.

The control section 761 includes, for example, a micro controller unit (MCU). The control section 761 controls the amount of infrared light emitted from the light-emitting section 762. The control section 761 also performs A/D conversion on the photoelectric signal (pulse wave signal) output from the light-receiving section 763, to thereby generate pulse wave data (biological signal data). Subsequently, the control section 761 outputs the pulse wave data (biological signal data) to the core unit 70 via the connection cable 79.

In the game apparatus body 5, the pulse wave data obtained from the vital sensor 76 is analyzed, whereby it is possible, by detecting the biological signal of the user using the vital sensor 76, to detect/calculate various biological indices of the user. As an example of a first biological index, in the game apparatus body 5, in accordance with peaks and dips of the pulse wave indicated by the pulse wave data obtained from the vital sensor 76, it is possible to detect the timing of the user's pulse (e.g., the times when the heart contracts, more exactly, the times when the blood vessels in the user's body part wearing the vital sensor 76 contract and expand). Specifically, in the game apparatus body 5, it is possible to detect, as the timing of the user's pulse, for example: the time when the pulse wave indicated by the pulse wave data obtained from the vital sensor 76 represents a local minimum value; the time when the pulse wave represents a local maximum value; the time when the blood vessel contraction rate reaches its maximum value; the time when the blood vessel expansion rate reaches its maximum value; the time when the acceleration rate of the blood vessel expansion rate reaches its maximum value; or the time when the deceleration rate of the blood vessel expansion rate reaches its maximum value. Note that, in the case of detecting, as the timing of the user's pulse, the time when the acceleration rate of the blood vessel expansion rate reaches its maximum value, or the time when the deceleration rate of the blood vessel expansion rate reaches its maximum value, it may be possible to use, as the timing of the user's pulse, parameters obtained by differentiating the blood vessel contraction rate or the blood vessel expansion rate, namely, the time when the acceleration of the blood vessel expansion or contraction reaches its maximum value.

As an example of a second biological index, it is possible to calculate a heart rate HR, using the timing of the user's pulse detected from the pulse wave indicated by the pulse wave data. For example, it is possible to calculate, as the heart rate HR of the user using the vital sensor 76, a value obtained by dividing 60 seconds by an interval between the timing of the pulse. Specifically, in the case where the time when the pulse wave represents a local minimum value is set as the timing of the pulse, 60 seconds is divided by a heartbeat interval (an RR interval shown in FIG. 9) between the heartbeats having adjoining two local minimum values, whereby it is possible to calculate the heart rate HR.

As an example of a third biological index, it is possible to calculate the respiratory cycle of the user by detecting an expiratory action/an inspiratory action of the user, using the rise-and-fall cycle of the heart rate HR. Specifically, when the heart rate HR calculated in the present embodiment is rising, it is determined that the user is breathing in, and when the heart rate HR is falling, it is determined that the user is breathing out. Thus the calculation of the rise-and-fall cycle (fluctuation cycle) of the heart rate HR makes it possible to calculate the cycle of breathing (respiratory cycle) of the user.

As an example of a fourth biological index, it is possible to determine the degree of easiness and difficulty felt by the user, using a pulse wave amplitude PA (e.g., the difference in height between a local maximum value of the pulse wave and the succeeding local minimum value; see FIG. 9) indicated by the pulse wave data obtained from the vital sensor 76. Specifically, when the pulse wave amplitude PA decreases, it is determined that the user is in a difficult state.

As an example of a fifth biological index, it is possible to obtain the blood flow rate of the user by dividing a pulse wave area PWA (see FIG. 9) obtained from the pulse wave signal by the heart rate HR.

As an example of a sixth biological index, it is possible to calculate the coefficient of variance of RR interval (CVRR) of the user, using an interval between the timing of the user's pulse (an interval between heartbeats; e.g., the RR interval shown in FIG. 9) detected from the pulse wave indicated by the pulse wave data. For example, the coefficient of variance of RR interval is calculated using the intervals between heartbeats based on the past 100 beats indicated by the pulse wave obtained from the vital sensor 76. Specifically, the following equation is applied for the calculation.

Coefficient of variance of RR interval={(standard deviation of intervals between 100 heartbeats)/(average value of intervals between 100 heartbeats)}×100

Using the coefficient of variance of RR interval, it is possible to calculate the state of the autonomic nerve (e.g., the activity of the parasympathetic nerve) of the user.

Figure 10:
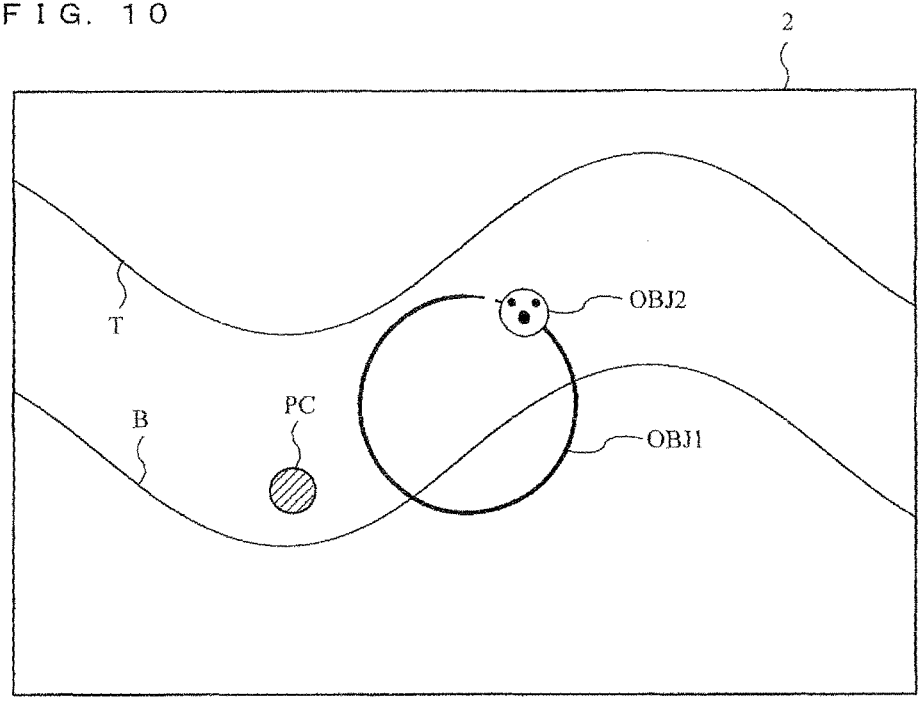
FIG. 10 is a diagram showing an example of a game image displayed on a monitor 2.
Figure 11:
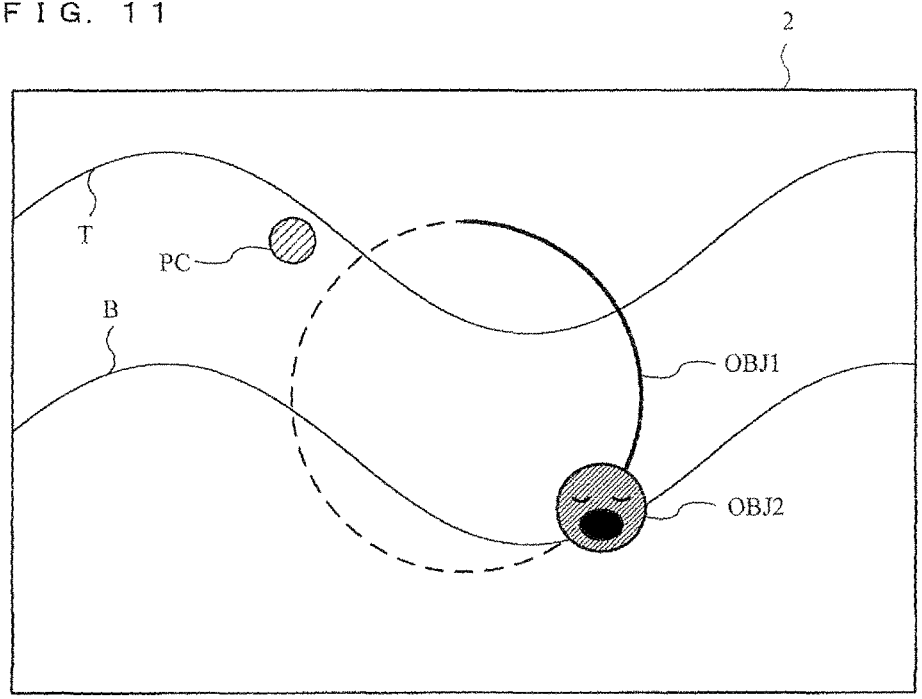
FIG. 11 is a diagram showing an example of a game image displayed on the monitor 2.

Next, with reference to FIGS. 10 through 13, a description is given of an overview of respiratory instruction processing and game processing performed by the game apparatus body 5, before descriptions are given of specific processes performed by the game apparatus body 5. Note that FIGS. 10 and 11 are diagrams showing examples of a game image, respectively, displayed on the monitor 2. FIG. 12 and FIG. 13 are diagrams showing examples of respiratory instruction images, respectively, displayed on the monitor 2.

Referring to FIGS. 10 and 11, on the monitor 2, a virtual game world is represented where obstacles (a top T and a bottom B) and a player character PC are arranged. On the monitor 2, a first object OBJ1 and a second object OBJ2 are also displayed as the respiratory instruction images for prompting a user to take a respiratory action.

The player character PC acts based on the biological signal (biological index) of the user. The player character PC is required to fly in the space (e.g., in a cave) between the top T and the bottom B that moves, for example, scrolling from left to right, so as to serve as the obstacles in the virtual game world. The player character PC can ascend, with the height of the top T as an upper limit, and descend, with the height of the bottom B as a lower limit. Here, the player character PC ascends and descends in accordance with the respiratory action of the user. For example, the player character PC ascends when the user is breathing in (taking an inspiratory action), and descends when the user is breathing out (taking an expiratory action). In the present invention, the heart rate HR of the user is calculated using the biological signal (pulse wave signal) described above. When the heart rate HR is rising, it is determined that the user is taking an inspiratory action, and when the heart rate HR is falling, it is determined that the user is taking an expiratory action. The heart rate HR is indicated by the number of heartbeats in 60 seconds. In the present invention, the heart rate HR is calculated by dividing 60 seconds by a heartbeat interval (the RR interval; e.g., the time from a local maximum value of the pulse wave to the succeeding local minimum value; see FIG. 9).

The rise and fall of the top T and the bottom B is calculated based on the respiratory cycle that the user is prompted to follow. For example, in the present invention, the respiratory cycle of the user is set to gradually change (e.g., slow), and the rise and fall of the top T and the bottom B is generated in accordance with the set respiratory cycle. When the player character PC has made contact with the top T or the bottom B, points are deducted from the score of the game. That is, in order to achieve a high score in the game, the user is required to take a respiratory action in the rise-and-fall cycle of the top T and the bottom B by causing the player character PC to ascend and descend in accordance with the rise and fall of the top T and the bottom B. In other words, the user is required to breathe so as to gradually change their own respiratory cycle.

The timing of the expiratory action/inspiratory action that the user is prompted to regulate is indicated by the first object OBJ1 and the second object OBJ2 (the respiratory instruction images). For example, the second object OBJ2 moves along the first object OBJ1 displayed in an annular manner, and indicates, by its expression and color, whether the present time is during a period to take an expiratory action (the state of FIG. 10) or a period to take an inspiratory action (the state of FIG. 11). The first object OBJ1 is displayed as, for example, a circular path along which the second object OBJ2 moves, and indicates, by the display form of the path, a period (expiratory period) during which the user is prompted to breathe out or a period (inspiratory period) during which the user is prompted to breathe in.

Figure 12A:
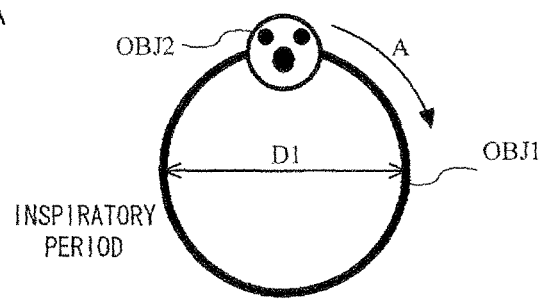
FIG. 12A is a diagram showing an example of respiratory instruction images displayed on the monitor 2 so as to prompt a user to take an inspiratory action.
Figure 12B:
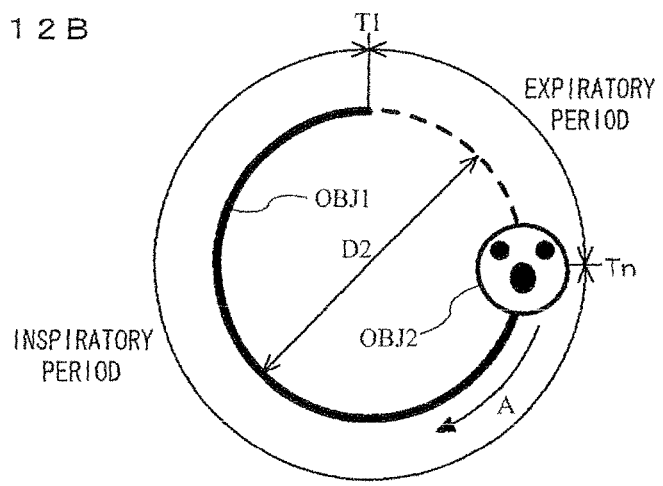
FIG. 12B is a diagram showing an example of the respiratory instruction images displayed on the monitor 2 so as to prompt the user to take the inspiratory action.
Figure 12C:
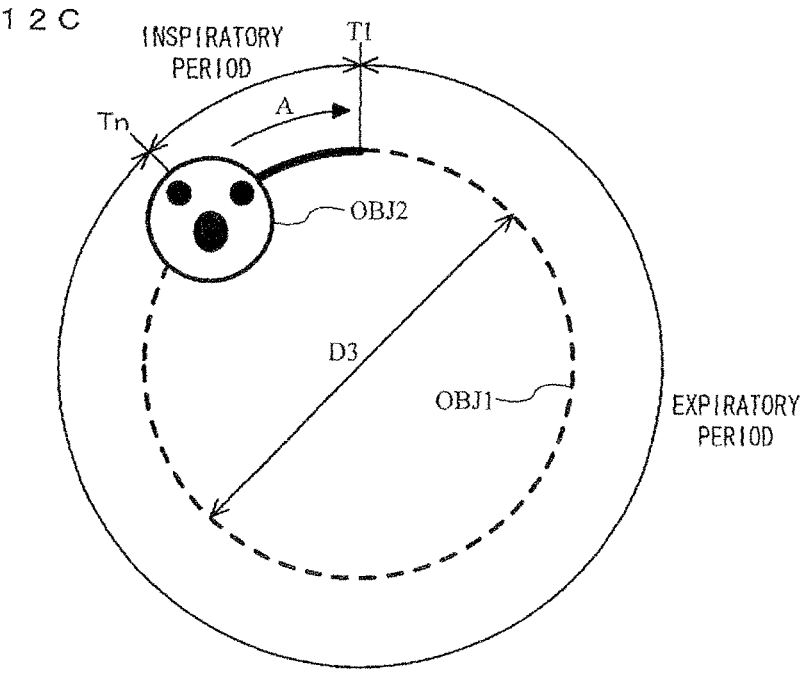
FIG. 12C is a diagram showing an example of the respiratory instruction images displayed on the monitor 2 so as to prompt the user to take the inspiratory action.

As shown in FIGS. 12A through 12C, the respiratory instruction images are represented as the first object OBJ1 and the second object OBJ2. Here, FIGS. 12A through 12C show examples of the respiratory instruction images for prompting the user to take an inspiratory action. In each figure, the second object OBJ2 is represented as a face image with a breathing-in expression, and is displayed in a first color that prompts the user to take an inspiratory action. The first object OBJ1 is displayed in the shape of a circle, and serves as the path along which the second object OBJ2 moves. The second object OBJ2 moves, in a direction A shown in FIGS. 12A through 12C, along the first object OBJ1 displayed in the shape of a circle, and moves in a circular motion with constant angular velocity while completing one full circuit of the circle.

The circle of the first object OBJ1 (the path for the second object OBJ2) distinguishes, by its display form, at least the expiratory period and the inspiratory period from each other. For example, in the example shown in FIG. 12A, the first object OBJ1 is represented by a solid line indicating that the entire circuit is the inspiratory period, and indicates that the period during which the second object OBJ2 completes one full circuit of the circle in a circular motion with constant angular velocity is the inspiratory period.

In the example shown in FIG. 12B, a state is represented where the second object OBJ2 has moved, in the direction A shown in the figures, from the state of FIG. 12A (the top position of the circle) to a position about a quarter of the circle of the first object OBJ1. In FIG. 12B, the first object OBJ1 is represented by a solid line indicating that the period from a present time Tn, which is where the second object OBJ2 is placed, to a time T1 when the second object OBJ2 reaches the top position of the circle of the first object OBJ1 is the inspiratory period, and indicates that the period until the time T1 when the second object OBJ2 reaches the top position in a circular motion with constant angular velocity is the inspiratory period. Further, in FIG. 12B, the first object OBJ1 is also represented by a dashed line indicating that the period after the time T1 is the expiratory period, and indicates that the inspiratory period will switch to the expiratory period at the time (the time T1) when the second object OBJ2 reaches the top position of the circle in a circular motion with constant angular velocity.

In the example shown in FIG. 12C, a state is represented where the second object OBJ2 has moved, further in the direction A shown in the figures, from the state of FIG. 12A (the top position of the circle) to a position about seven-eighths of the circle of the first object OBJ1. In FIG. 12C, the first object OBJ1 is represented by a solid line indicating that the period from the present time Tn, which is where the second object OBJ2 is placed, to the time T1 when the second object OBJ2 reaches the top position of the circle of the first object OBJ1 is the inspiratory period, and indicates that the period until the time T1 when the second object OBJ2 reaches the top position in a circular motion with constant angular velocity is the inspiratory period. Further, in FIG. 12C, the first object OBJ1 is also represented by a dashed line indicating that the period after the time T1 is the expiratory period, and indicates that the inspiratory period will switch to the expiratory period at the time (the time T1) when the second object OBJ2 reaches the top position of the circle in a circular motion with constant angular velocity.

Here, as is clear from FIGS. 12A through 12C, in the inspiratory period during which the user is prompted to take an inspiratory action, the respiratory instruction images are displayed such that the first object OBJ1 and the second object OBJ2 are gradually enlarged until the inspiratory period ends. For example, when the diameter of the circle of the first object OBJ1 is: D1 in FIG. 12A; D2 in FIG. 12B; and D3 in FIG. 12C, it is D1<D2<D3. Thus the gradual enlargement of the first object OBJ1 and the second object OBJ2 makes it possible to prompt, also visually, the user to breathe in.

Figure 13A:
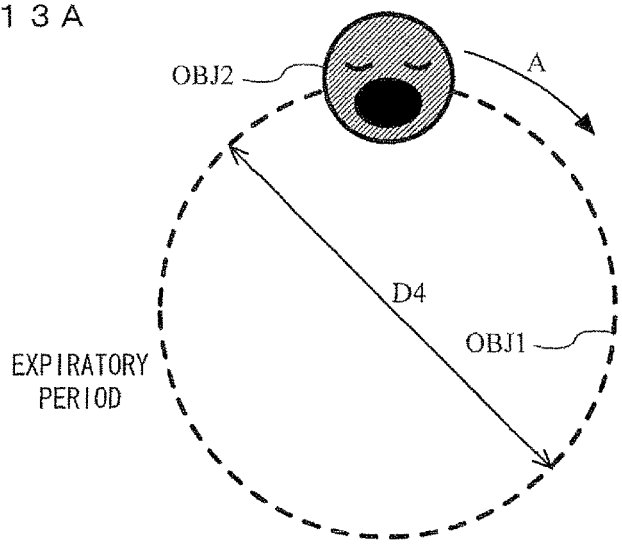
FIG. 13A is a diagram showing an example of the respiratory instruction images displayed on the monitor 2 so as to prompt the user to take an expiratory action.
Figure 13B:
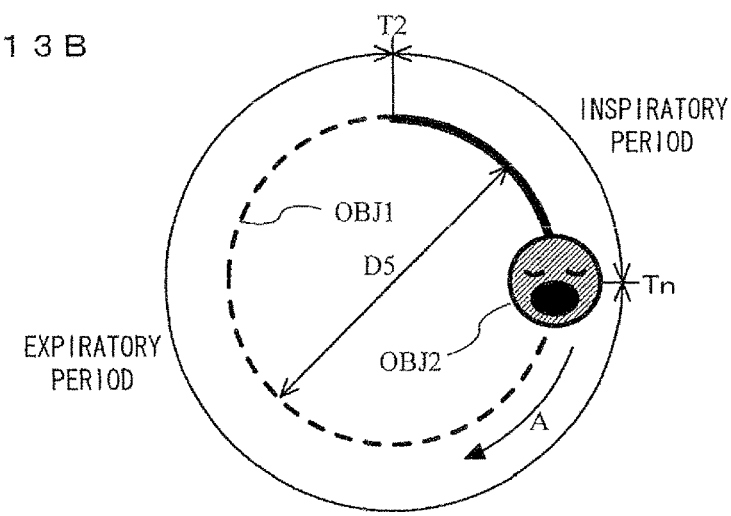
FIG. 13B is a diagram showing an example of the respiratory instruction images displayed on the monitor 2 so as to prompt the user to take the expiratory action.
Figure 13C:
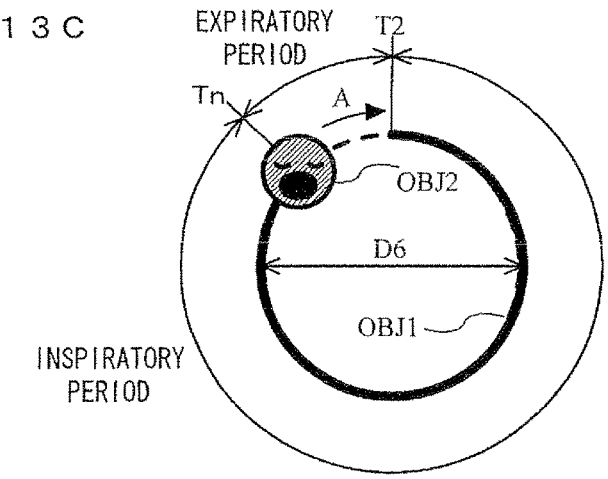
FIG. 13C is a diagram showing an example of the respiratory instruction images displayed on the monitor 2 so as to prompt the user to take the expiratory action.

FIGS. 13A through 13C show examples of the respiratory instruction images for prompting the user to take an expiratory action. In each figure, the second object OBJ2 is represented as a face image with a breathing-out expression, and is displayed in a second color that prompts the user to take an expiratory action. Similarly to the inspiratory period, the first object OBJ1 is displayed in the shape of a circle. The second object OBJ2 moves, in a direction A shown in FIGS. 13A through 13C, along the first object OBJ1 displayed in the shape of a circle, and moves in a circular motion with constant angular velocity while completing one full circuit of the circle.

In the example shown in FIG. 13A, the first object OBJ1 is represented by a dashed line indicating that the entire circuit is the expiratory period, and indicates that the period during which the second object OBJ2 completes one full circuit of the circle in a circular motion with constant angular velocity is the expiratory period. For example, the example of the respiratory instruction images shown in FIG. 13A is displayed at the time when the inspiratory period has ended and switched to the expiratory period, the respiratory instruction images shown in FIGS. 12A through 12C having been displayed during the inspiratory period.

In the example shown in FIG. 13B, a state is represented where the second object OBJ2 has moved, in the direction A shown in the figures, from the state of FIG. 13A (the top position of the circle) to a position about a quarter of the circle of the first object OBJ1. In FIG. 13B, the first object OBJ1 is represented by a dashed line indicating that the period from a present time Tn, which is where the second object OBJ2 is placed, to a time T2 when the second object OBJ2 reaches the top position of the circle of the first object OBJ1 is the expiratory period, and indicates that the period until the time T2 when the second object OBJ2 reaches the top position in a circular motion with constant angular velocity is the expiratory period. Further, in FIG. 13B, the first object OBJ1 is also represented by a solid line indicating that the period after the time T2 is the inspiratory period, and indicates that the expiratory period will switch to the inspiratory period at the time (the time T2) when the second object OBJ2 reaches the top position of the circle in a circular motion with constant angular velocity.

In the example shown in FIG. 13C, a state is represented where the second object OBJ2 has moved, further in the direction A shown in the figures, from the state of FIG. 13A (the top position of the circle) to a position about seven-eighths of the circle of the first object OBJ1. In FIG. 13C, the first object OBJ1 is represented by a dashed line indicating that the period from the present time Tn, which is where the second object OBJ2 is placed, to the time T2 when the second object OBJ2 reaches the top position of the circle of the first object OBJ1 is the expiratory period, and indicates that the period until the time T2 when the second object OBJ2 reaches the top position in a circular motion with constant angular velocity is the expiratory period. Further, in FIG. 13C, the first object OBJ1 is also represented by a solid line indicating that the period after the time T2 is the inspiratory period, and indicates that the expiratory period will switch to the inspiratory period at the time (the time T2) when the second object OBJ2 reaches the top position of the circle in a circular motion with constant angular velocity. The example of the respiratory instruction images shown in FIG. 12A is displayed at the time when the expiratory period has ended and switched to the inspiratory period, the respiratory instruction image shown in FIGS. 13A through 13C having been displayed during the expiratory period.

Here, as is clear from FIGS. 13A through 13C, in the expiratory period during which the user is prompted to take an expiratory action, the respiratory instruction images are displayed such that the first object OBJ1 and the second object OBJ2 are gradually reduced until the expiratory period ends. For example, when the diameter of the circle of the first object OBJ1 is: D4 in FIG. 13A; D5 in FIG. 13B; and D6 in FIG. 13C, it is D4>D5>D6. Thus the gradual reduction of the first object OBJ1 and the second object OBJ2 makes it possible to prompt, also visually, the user to breathe out.

Note that the second object OBJ2 moves, along the first object OBJ1 displayed in the shape of a circle, in a circular motion with constant angular velocity while completing one full circuit of the circle, and makes a circular motion maintaining the same angular velocity, while indicating that the present time is during the expiratory period or while indicating that the present time is during the inspiratory period. This makes it easy for the user to understand the time when the expiratory period or the inspiratory period ends. In order to change the respiratory cycle that the user is prompted to follow, however, the angular velocity of the circular motion may be changed at the time when the expiratory period switches to the inspiratory period or at the time when the inspiratory period switches to the expiratory period. For example, in order to lengthen the respiratory cycle that the user is prompted to follow, the angular velocity of the circular motion of the second object OBJ2 is made relatively small at the above time, and therefore it is possible to instruct the user to follow an expiratory period or an inspiratory period set based on the lengthened respiratory cycle.

Note that in the above examples, the first object OBJ1 is displayed by distinguishing the inspiratory period and the expiratory period from each other by the line type (e.g., a solid line and a dashed line) of the circle of the first object OBJ1. The first object OBJ1, however, may be displayed on the monitor 2 by distinguishing the inspiratory period and the expiratory period from each other by another display form. For example, the first object OBJ1 may be displayed on the monitor 2 by distinguishing the inspiratory period and the expiratory period from each other by the color of the circle of the first object OBJ1. Alternatively, the first object OBJ1 may be displayed on the monitor 2 without distinguishing the inspiratory period and the expiratory period from each other by the display form of the circle of the first object OBJ1. For example, at the time when respiratory actions switch (e.g., at the time when the inspiratory period switches to the expiratory period, or at the time when the expiratory period switches to the inspiratory period), only the switching of the periods may be displayed on the monitor 2 by providing a predetermined mark (sign) to the position on the circle where the second object OBJ2 is placed.

As is clear from FIGS. 12B, 12C, 13B, and 13C, in the circle of the first object OBJ1, the display form of the part passed by the second object OBJ2 is sequentially changed to the display form corresponding to the respiratory action that the user is to be instructed to take when the second object OBJ2 moves along the passed part of the circle in the subsequent circuit. This causes the respiratory action instruction scheduled for the subsequent circuit to be indicated in the circle of the first object OBJ1 to the user, and therefore the user can prepare in advance in accordance with the scheduled respiratory action instruction. The second object OBJ2 moving around along the circle of the first object OBJ1: in the expiratory period, completes one full circuit of the circle in the time from the beginning to the end of the expiratory period; and in the inspiratory period, completes one full circuit of the circle in the time from the beginning to the end of the inspiratory period. Thus, instructions are continuously given to follow these periods. That is, a respiratory action instruction by the display form of the circle of the first object OBJ1 indicates the expiratory period and the inspiratory period that switch every circuit of the circle. Thus, in the circle of the first object OBJ1, the part which has been passed by the second object OBJ2 and whose display form has thereby changed can also be used as an indicator of the time elapsed (elapsed portion) during the expiratory period or the inspiratory period that an instruction is being given to follow at the present time.

Note that in the examples of the respiratory instruction images described above, the expiratory period and the inspiratory period switch at the top position of the circle of the first object OBJ1. Similarly, descriptions are given below also using the examples where the expiratory period and the inspiratory period switch at the top position of the circle.

Next, a description is given of details of the respiratory instruction processing and the game processing performed by the game system 1. First, with reference to FIG. 14, a description is given of main data used in the respiratory instruction processing and the game processing. Note that FIG. 14 is a diagram showing an example of the main data and programs stored in the external main memory 12 and/or the internal main memory 35 (hereinafter, the two main memories are collectively referred to simply as a "main memory") of the game apparatus body 5.

Figure 14:
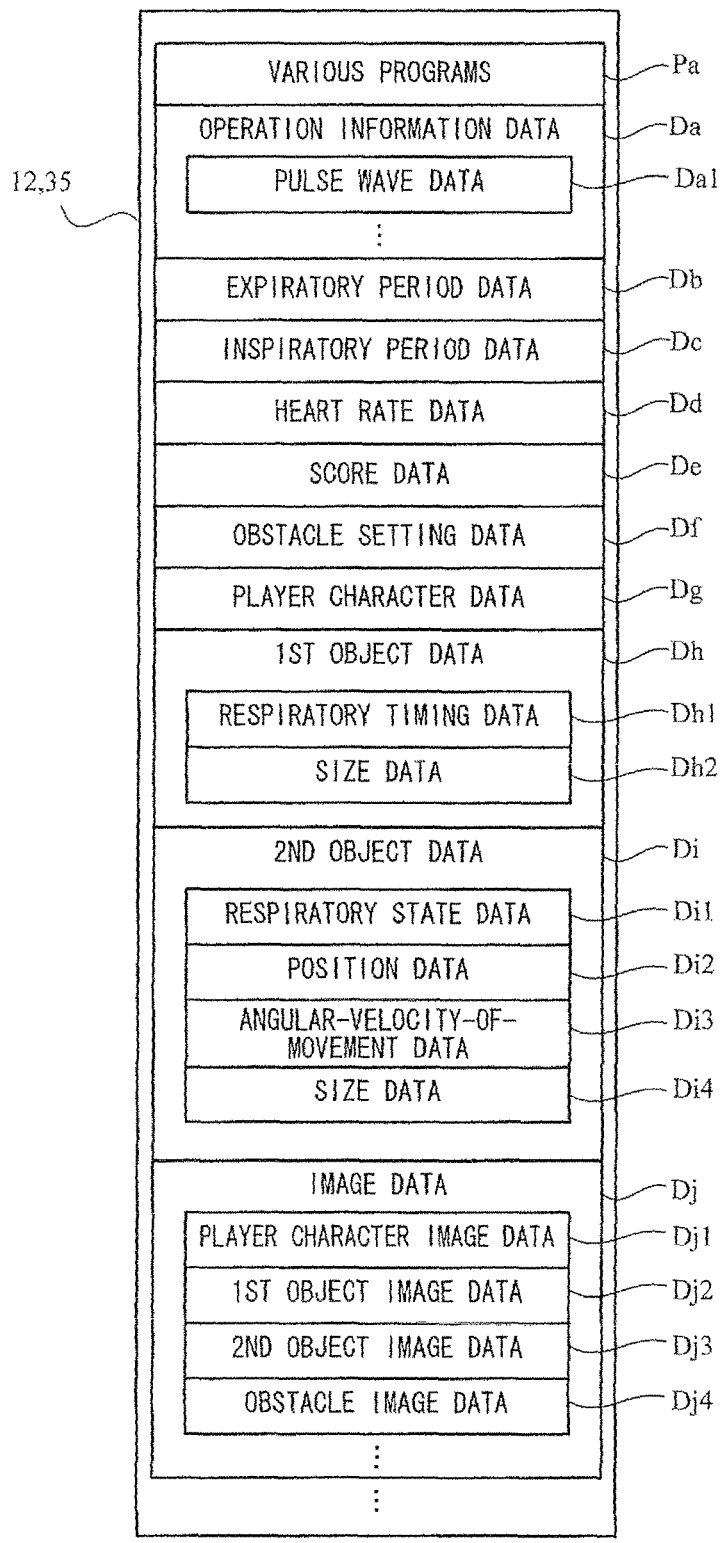
FIG. 14 is a diagram showing an example of main data and programs stored in a main memory of the game apparatus body 5.

As shown in FIG. 14, the following are stored in a data storage area of the main memory: operation information data Da; expiratory period data Db; inspiratory period data Dc; heart rate data Dd; score data De; obstacle setting data Df; player character data Dg; first object data Dh; second object data Di; image data Dj; and the like. Note that the main memory stores therein, as well as the data shown in FIG. 14, data necessary for the respiratory instruction processing and the game processing, such as: data (position data and the like) about other objects appearing in the game; and data (background data and the like) about the virtual game world. Further, in a program storage area of the main memory, various programs Pa are stored that configure the game program (the respiratory instruction program).

The operation information data Da includes pulse wave data Da1 and the like. The pulse wave data Da1 represents the pulse wave signal (biological signal) obtained from the vital sensor 76, and is included in a series of pieces of operation information transmitted as transmission data from the core unit 70. A piece of pulse wave data stored in the pulse wave data Da1 is invariably updated to the latest piece of pulse wave data in accordance with the reception of the operation information transmitted from the core unit 70. Note that the pulse wave data stored in the pulse wave data Da1 may be stored as the history of pulse wave signals that covers a required length of time depending on the game to be played. Also in this case, the pulse wave data is appropriately updated in accordance with the reception of the operation information. Further, the wireless controller module 19 of the game apparatus body 5 receives the biological signal data transmitted from the core unit 70 at predetermined intervals (e.g., every 1/200 seconds) and included in the operation information, and stores the received data in a buffer (not shown) of the wireless controller module 19. Subsequently, the biological signal data stored in the buffer is read every one-frame period (e.g., every 1/60 seconds), which corresponds to the game processing cycle, to thereby update the pulse wave data Da1 of the main memory.

In this case, the cycle of receiving the operation information and the processing cycle differ, and therefore the buffer has written therein a plurality of pieces of the operation information received at multiple times. In the descriptions of processes given later, the process is performed in each step invariably using only the latest piece among a plurality of pieces of the operation information received at multiple times, and the processing proceeds to the subsequent step.

In addition, a process flow will be described later using an example where the pulse wave data Da1 is updated every one-frame period, which corresponds to the game processing cycle. The pulse wave data Da1, however, may be updated in another processing cycle. For example, the pulse wave data Da1 may be updated in each transmission cycle of the core unit 70, and the updated pulse wave data Da1 may be used in each game processing cycle. In this case, the cycle of updating the pulse wave data Da1 and the game processing cycle differ.

The expiratory period data Db represents the period (the length of the expiratory period) during which the user breathes out when prompted to breathe. The inspiratory period data Dc represents the period (the length of the inspiratory period) during which the user breathes in when prompted to breathe.

The heart rate data Dd represents the history of the heart rates of the user calculated based on the pulse wave data Da1, the history covering a predetermined length of time. The score data De represents the score of the game. The obstacle setting data Df represents the obstacles (the top T and the bottom B) in the virtual game world that are set based on the rise-and-fall cycle calculated in accordance with the respiratory cycle that the user is prompted to follow. The player character data Dg represents the position of the player character PC arranged in the virtual game world, and the like.

The first object data Dh is data about the first object OBJ1, and includes respiratory timing data Dh1 and size data Dh2. The respiratory timing data Dh1 represents, in the circle represented by the first object OBJ1, the range displayed as the expiratory period and the range displayed as the inspiratory period. The size data Dh2 represents the size (e.g., a diameter D) of the circle represented by the first object OBJ1.

The second object data Di is data about the second object OBJ2, and includes respiratory state data Di1, position data Di2, angular-velocity-of-movement data Di3, and size data Di4. The respiratory state data D11 represents the display form (e.g., the expression and the color) of the second object OBJ2 to be indicated to the user in accordance with the respiratory action (i.e., an expiratory action or an inspiratory action) that the user is being prompted to take at the present time. The position data Di2 represents the position of the second object OBJ2 on the circle represented by the first object OBJ1. The angular-velocity-of-movement data Di3 represents the angular velocity of the circular motion of the second object OBJ2 along the circle. The size data Di4 represents the size of the second object OBJ2.

The image data Dj includes player character image data Dj1, first object image data Dj2, second object image data Dj3, obstacle image data Dj4, and the like. The player character image data Dj1 is used to generate a game image by arranging the player character PC in the virtual game world. The first object image data Dj2 is used to generate a respiratory instruction image by displaying the first object OBJ1. The second object image data Dj3 is used to generate a respiratory instruction image by displaying the second object OBJ2. The obstacle image data Dj4 is used to generate a game image by arranging the obstacles such as the top T and the bottom B in the virtual game world.

Figure 15:
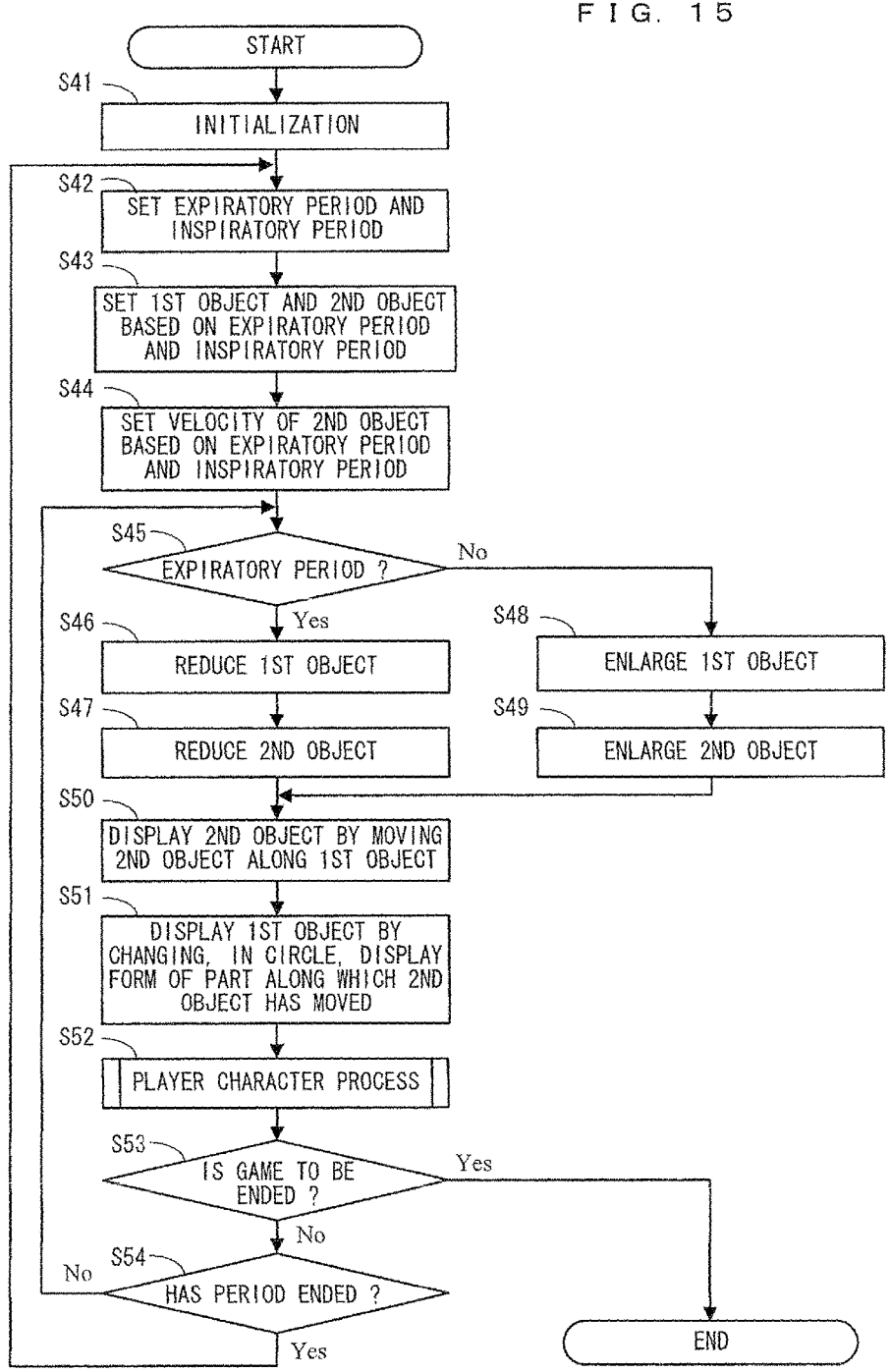
FIG. 15 is a flow chart showing an example of a main process performed by the game apparatus body 5.
Figure 16:
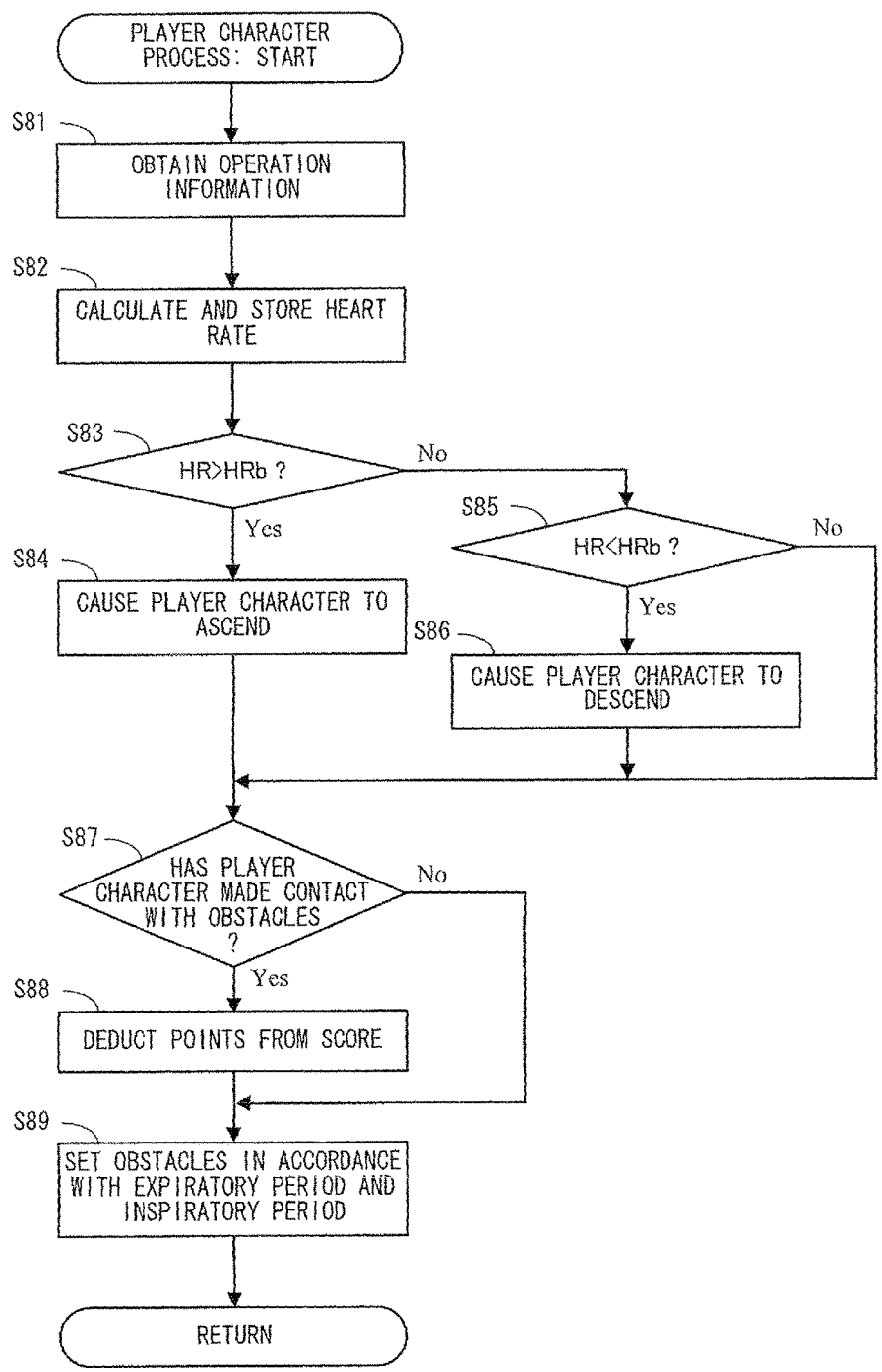
FIG. 16 is a subroutine flow chart showing an example of details of a player character process shown in step 52 of FIG. 15.

Next, with reference to FIGS. 15 and 16, a description is given of details of the respiratory instruction processing and the game processing performed by the game apparatus body 5. Note that FIG. 15 is a flow chart showing an example of a main process performed by the game apparatus body 5. FIG. 16 is a subroutine flow chart showing an example of details of a player character process shown in step 52 of FIG. 15. Note that in the flow charts shown in FIGS. 15 and 16, descriptions are mainly given of, among various processes, a process of instructing the user to take a respiratory action and a process of using the biological signal from the vital sensor 76. Thus other processes not directly related to the present invention are not described in detail. Note that in FIGS. 15 and 16, each step performed by the CPU 10 is abbreviated as "S".

When the game apparatus body 5 is turned on, the CPU 10 of the game apparatus body 5 executes the boot program stored in the ROM/RTC 13, to thereby initialize each unit such as the main memory. The game program (the respiratory instruction program) stored in the optical disk 4 is loaded into the main memory, and the CPU 10 starts the execution of the game program. The flow chart shown in FIG. 15 shows the main process performed after this process.

Referring to FIG. 15, the CPU 10 performs the initialization of the game processing (step 41), and proceeds to the subsequent step. In the initialization of the game processing in step 41, for example, the CPU 10 sets the virtual game world and initializes the player character PC, the top T, the bottom B, and the like, to thereby update the obstacle setting data Df, the player character data Dg, and the like. In the initialization of the game processing in step 41, the CPU 10 also initializes the parameters to be used in the rest of the game processing and the respiratory instruction processing. For example, the CPU 10 initializes the score data De to a score indicating full points (e.g., 100 points).

Next, the CPU 10 sets the expiratory period and the inspiratory period during which the user is prompted to breathe (step 42), and proceeds to the subsequent step. For example, when the expiratory period data Db and the inspiratory period data Dc are in the initialized state where neither of the expiratory period and the inspiratory period is set, respectively, the CPU 10 sets the expiratory period and the inspiratory period to predetermined initial values, to thereby update the expiratory period data Db and the inspiratory period data Dc, using the set expiratory period and inspiratory period, respectively. When the expiratory period and the inspiratory period are already set in the expiratory period data Db and the inspiratory period data Dc, respectively, the CPU 10 changes the expiratory period and the inspiratory period based on predetermined conditions for change. For example, when a predetermined number of respirations have been taken after the expiratory period and the inspiratory period had been updated, the CPU 10 sets each of the expiratory period and the inspiratory period, indicated by the expiratory period data Db and the inspiratory period data Dc, respectively, to a time (e.g., a 20% longer time) obtained by lengthening the corresponding period by a predetermined rate, or a time (e.g., a 20% shorter time) obtained by shortening the corresponding period by a predetermined rate. Thus the CPU 10 updates the expiratory period data Db and the inspiratory period data Dc, using the set expiratory period and inspiratory period, respectively.

Next, based on the set expiratory period and inspiratory period, the CPU 10 sets the first object OBJ1 and the second object OBJ2 (step 43), and proceeds to the subsequent step. For example, when the CPU 10 is to instruct the user to breathe out hereafter, the CPU 10 updates the first object data Dh by: setting the entire circle of the first object OBJ1 to the display form indicating the expiratory period; and setting the size of the circle to a predetermined maximum size. The CPU 10 also updates the second object data Di by: setting the second object OBJ2 to the display form (e.g., the breathing-in expression in the second color) indicating an expiratory action; setting the size of the second object OBJ2 to a predetermined maximum size; and setting the display position of the second object OBJ2 to the top position of the circle of the first object OBJ1. In contrast, when the CPU 10 is to instruct the user to breathe in hereafter, the CPU 10 updates the first object data Dh by: setting the entire circle of the first object OBJ1 to the display form indicating the inspiratory period; and setting the size of the circle to a predetermined minimum size. The CPU 10 also updates the second object data Di by: setting the second object OBJ2 to the display form (e.g., the breathing-in expression in the first color) indicating an inspiratory action; setting the size of the second object OBJ2 to a predetermined minimum size; and setting the display position of the second object OBJ2 to the top position of the circle of the first object OBJ1.

Next, based on the set expiratory period and inspiratory period, the CPU 10 sets the velocity of the movement of the second object OBJ2 (step 44), and proceeds to the subsequent step. For example, when the CPU 10 is to instruct the user to breathe out hereafter, the CPU 10 sets the angular velocity of the second object OBJ2 such that the second object OBJ2 completes one full circuit of the circle of the first object OBJ1 at a constant angular velocity in the length of time of the expiratory period indicated by the expiratory period data Db. Subsequently, the CPU 10 updates the angular-velocity-of-movement data Di3, using the set angular velocity. In contrast, when the CPU 10 is to instruct the user to breathe in hereafter, the CPU 10 sets the angular velocity of the second object OBJ2 such that the second object OBJ2 completes one full circuit of the circle of the first object OBJ1 at a constant angular velocity in the length of time of the inspiratory period indicated by the inspiratory period data Dc. Subsequently, the CPU 10 updates the angular-velocity-of-movement data Di3, using the set angular velocity.

Next, the CPU 10 determines whether or not the present time is during the expiratory period (step 45). When the present time is during the expiratory period, the CPU 10 proceeds to step 46. In contrast, when the present time is during the inspiratory period, the CPU 10 proceeds to step 48.

In step 46, the CPU 10 reduces the size of the first object OBJ1 to thereby set the reduced size, and proceeds to the subsequent step. For example, the CPU 10 reduces the size of the circle of the first object OBJ1, indicated by the size data Dh2, based on a predetermined function (e.g., a function where: the size becomes a maximum value at the beginning point of the expiratory period; the size gradually decreases in a sine curve with the passage of time during the expiratory period; and the size becomes a minimum value at the end point of the expiratory period), to thereby update the size data Dh2, using the reduced size of the circle.

Next, the CPU 10 reduces the size of the second object OBJ2 to thereby set the reduced size (step 47), and proceeds to step 50. For example, the CPU 10 reduces the size of the second object OBJ2, indicated by the size data Di4, based on a predetermined function (e.g., a function where: the size becomes a maximum value at the beginning point of the expiratory period; the size gradually decreases in a sine curve with the passage of time during the expiratory period;

and the size becomes a minimum value at the end point of the expiratory period), to thereby update the size data Di4, using the reduced size of the circle.

In step 48, in contrast, the CPU 10 enlarges the size of the first object OBJ1 to thereby set the enlarged size, and proceeds to the subsequent step. For example, the CPU 10 enlarges the size of the circle of the first object OBJ1, indicated by the size data Dh2, based on a predetermined function (e.g., a function where: the size becomes a minimum value at the beginning point of the inspiratory period; the size gradually increases in a sine curve with the passage of time during the inspiratory period; and the size becomes a maximum value at the end point of the inspiratory period), to thereby update the size data Dh2, using the enlarged size of the circle.

Next, the CPU 10 enlarges the size of the second object OBJ2 to thereby set the enlarged size (step 49), and proceeds to step 50. For example, the CPU 10 enlarges the size of the second object OBJ2, indicated by the size data Di4, based on a predetermined function (e.g., a function where: the size becomes a minimum value at the beginning point of the inspiratory period; the size gradually increases in a sine curve with the passage of time during the inspiratory period; and the size becomes a maximum value at the end point of the inspiratory period), to thereby update the size data Di4, using the enlarged size of the circle.

In step 50, the CPU 10 moves the second object OBJ2 along the circle of the first object OBJ1 to thereby display the second object OBJ2, and proceeds to the subsequent step. For example, the CPU 10 obtains the position of the second object OBJ2 before the movement, using the position data Di2. The CPU 10 also obtains the size of the circle of the first object OBJ1 and the angular velocity of movement of the second object OBJ2, using the size data Dh2 and the angular-velocity-of-movement data Di3, respectively. Thus the CPU 10 calculates the position of the second object OBJ2 after the movement, based on the position of the second object OBJ2 before the movement, the size of the circle of the first object OBJ1, and the angular velocity of movement of the second object OBJ2, to thereby update the position data Di2, using the calculated position. Subsequently, the CPU 10 displays the second object OBJ2 on the monitor 2, based on the display form, the display position, and the size that correspond to the respiratory state data D11, the position data Di2, and the size data Di4, respectively.

Next, the CPU 10 changes, in the circle of the first object OBJ1, the display form of the part corresponding to the path along which the second object OBJ2 has moved, to thereby display the first object OBJ1 (step 51), and proceeds to the subsequent step. For example, the CPU 10 obtains the present position of the second object OBJ2, using the position data Di2. Thus the CPU 10 sets the part of the circle (hereinafter occasionally referred to as a "backward path") from the top position of the circle of the first object OBJ1 to the present position of the second object OBJ2 in the moving direction (the direction A shown in FIGS. 12 and 13) of the second object OBJ2, to a display form different from the display form of the part of the circle (hereinafter occasionally referred to as a "forward path") from the present position of the second object OBJ2 to the top position of the circle of the first object OBJ1 in the moving direction of the second object OBJ2. Specifically, when the present time is during the inspiratory period, the forward path is represented by the display form (e.g., a solid line) indicating the inspiratory period. The CPU 10 sets the entire backward path to the display form (e.g., a dashed line) indicating the expiratory period (see FIGS. 12B and 12C). In contrast, when the present time is during the expiratory period, the forward path is represented by the display form (e.g., a dashed line) indicating the expiratory period. The CPU 10 sets the entire backward path to the display form (e.g., a solid line) indicating the inspiratory period (see FIGS. 13B and 13C). Thus the CPU 10 updates the respiratory timing data Dh1, using the set display form of the first object OBJ1, and displays the first object OBJ1 on the monitor 2 in accordance with the display form.

Next, the CPU 10 performs a process regarding the player character PC (step 52), and proceeds to the subsequent step. With reference to FIG. 16, a description is given below of the player character process performed in step 52.

Referring to FIG. 16, the CPU 10 obtains data representing operation information from the core unit 70 (step 81), and proceeds to the subsequent step. For example, the CPU 10 obtains operation information received from the core unit 70, to thereby update the pulse wave data Da1, using the pulse wave signal (biological signal) represented by the latest piece of the biological signal data included in the operation information received from the core unit 70.

Next, the CPU 10 calculates the heart rate HR of the user, to thereby update the history of the heart rate data Dd (step 82), and proceeds to the subsequent step. For example, the CPU 10 calculates the present heartbeat interval (RR interval; see FIG. 9), referring to the pulse wave signal of the pulse wave data Da1. Thus the CPU 10 calculates the heart rate HR by dividing 60 seconds by the heartbeat interval, and adds, to the heart rate data Dd, data representing the newly calculated heart rate HR, to thereby update the history of the heart rates HR. Note that as will be described in detail later, the process can be performed so long as at least the previously calculated heart rate HR is secured in the history of the heart rates HR, and therefore the heart rates HR other than that calculated in the previous process may be deleted from the history when a new heart rate HR is added. Further, when the respiratory cycle that the user is to prompted to follow is set based on the cycle in which the user is actually breathing at the present time, it is necessary to secure the history of the heart rates HR so as to cover a predetermined length of time (e.g., a time longer than one respiratory cycle of the user). Thus, in this case, the heart rates that are old with respect to the predetermined length of time may be deleted from the past history when a new heart rate HR is added.

Next, the CPU 10 determines whether or not the heart rate HR calculated in step 82 is greater than a previously calculated heart rate HRb (step 83), and determines whether or not the heart rate HR calculated in step 82 is smaller than the previously calculated heart rate HRb (step 85). When the heart rate HR calculated in step 82 is greater than the previously calculated heart rate HRb ("Yes" in step 83), the CPU 10 proceeds to step 84. When the heart rate HR calculated in step 82 is smaller than the previously calculated heart rate HRb ("Yes" in step 85), the CPU 10 proceeds to step 86. When the heart rate HR calculated in step 82 is equal to the previously calculated heart rate HRb ("No" in both step 83 and step 85), the CPU 10 proceeds to step 87.

In step 84, the CPU 10 causes the player character PC to ascend in the virtual game world by a predetermined amount, to thereby display the player character PC on the monitor 2, and proceeds to step 87. For example, the CPU 10 calculates the amount of ascent of the player character PC in the virtual game world, to thereby update the player character data Dg, using the calculated amount of ascent. Thus the CPU 10 causes the player character PC to ascend to the position, indicated by the player character data Dg, in the virtual game world, to thereby display the player character PC on the monitor 2. Note that when caused to ascend to the position determined in step 84, the player character PC may ascend by a constant amount, or may ascend by the amount of ascent varied depending on the difference value between the heart rate HRb and the heart rate HR.

In step 86, in contrast, the CPU 10 causes the player character PC to descend in the virtual game world by a predetermined amount, to thereby display the player character PC on the monitor 2, and proceeds to step 87. For example, the CPU 10 calculates the amount of descent of the player character PC in the virtual game world, to thereby update the player character data Dg, using the calculated amount of descent. Thus the CPU 10 causes the player character PC to descend to the position, indicated by the player character data Dg, in the virtual game world, to thereby display the player character PC on the monitor 2. Note that when caused to descend to the position determined in step 86, the player character PC may descend by a constant amount, or may descend by the amount of descent varied depending on the difference value between the heart rate HRb and the heart rate HR.

In step 87, the CPU 10 determines whether or not the player character PC has made contact with the obstacles (the top T and the bottom B) in the virtual game world. For example, when the player character PC has made contact with the bottom B or with the top T while flying, the CPU 10 determines that the player character PC has made contact with the obstacles. When the player character PC has made contact with the obstacles, the CPU 10 proceeds to step 88. When the player character PC has not made contact with the obstacles, the CPU 10 proceeds to step 89.

In step 88, the CPU 10 deducts predetermined points from the score of the game, and proceeds to step 89. For example, the CPU 10 deducts, from the score indicated by the score data De, the points corresponding to the contact with the obstacles, to thereby update the score data De, using the score after the deduction. Here, the points to be deducted may be varied depending on the state of the contact between the player character PC and the obstacles. As a first example, the deduction points are increased in accordance with the time during which the player character PC is making contact with the obstacles. As a second example, the deduction points are increased in accordance with the amount of overlap between the player character PC and the obstacles that are making contact with each other. As a third example, the deduction points are increased in accordance with the number of times the player character PC has made contact with the obstacles. As a fourth example, the deduction points are increased in accordance with the type (e.g., the top T or the bottom B) of the obstacles with which the player character PC is making contact. As a fifth example, the deduction points are varied by combining at least two of the above first through fourth examples.

Note that in the above process, when the player character PC has made contact with, or has overlapped, the obstacles, a negative rating is given by deducting points from the score of the game such that the lower the score of the game, the lower the rating in the game. The score, however, may be varied in another manner. As a first example, the score is 0 at the beginning of the game, and when the player character PC has made contact with, or has overlapped, the obstacles, a negative rating is given by adding points to the score of the game. In this case, the higher the score of the game, the lower the rating in the game. As a second example, the score is 0 at the beginning of the game, and points are added to the score as time passes in the game. When the player character PC has made contact with, or has overlapped, the obstacles during the game, a negative rating is given by not adding points to the score. In this case, the lower the score of the game, the lower the rating in the game.

In step 89, the CPU 10 sets and displays the obstacles in the virtual game world in accordance with the expiratory period indicated by the expiratory period data Db and the inspiratory period indicated by the inspiratory period data Dc, and ends the process of this subroutine. For example, based on the expiratory period indicated by the expiratory period data Db and the inspiratory period indicated by the inspiratory period data Dc, the CPU 10 calculates the respiratory cycle that the user is prompted to follow, and sets the rise-and-fall cycle of the obstacles in accordance with the calculated respiratory cycle. Thus, based on the set rise-and-fall cycle, the CPU 10 generates the top T and the bottom B (obstacle images), to thereby display the obstacle images on the monitor 2. As an example, the CPU 10 adjusts the shapes of the top T and the bottom B such that the top T and the bottom B rise and fall in the set rise-and-fall cycle when the player character PC flies in the virtual game world, to thereby display the top T and the bottom B on the monitor 2 in a scroll manner.

Referring back to FIG. 15, after performing the player character process of step 52, the CPU 10 determines whether or not the game is to be ended (step 53). Conditions for ending the game may be, for example: that particular conditions are satisfied so that the game is over; that the length of the respiratory cycle that the user is instructed to follow has reached the length of a predetermined target cycle; or that the user has performed an operation for ending the game. When the game is not to be ended, the CPU 10 proceeds to step 54. When the game is to be ended, the CPU 10 ends the process of the flow chart.

In step 54, the CPU 10 determines whether or not the expiratory period or the inspiratory period that the user is presently prompted to follow has ended. When the expiratory period or the inspiratory period that the user is presently prompted to follow has ended, the CPU 10 repeats the process, returning to step 42. When the expiratory period or the inspiratory period that the user is presently prompted to follow has not ended and the present time is during either period, the CPU 10 repeats the process, returning to step 45. As an example, when the present time is at the time when the expiratory period during which the user is prompted to breathe out ends, the CPU 10, returning to step 42, displays on the monitor 2 the respiratory instruction image (e.g., the respiratory instruction image shown in FIG. 12A) indicating that the inspiratory period is to start hereafter by replacing the expiratory period that, up to the present time, an instruction has been given to follow. As another example, when the present time is at the time when the inspiratory period during which the user is prompted to breathe in ends, the CPU 10, returning to step 42, displays on the monitor 2 the respiratory instruction image (e.g., the respiratory instruction image shown in FIG. 13A) that the expiratory period is to start hereafter by replacing the inspiratory period that, up to the present time, an instruction has been given to follow.

Thus, by the display form of the first object OBJ1 and the position of the second object OBJ2, the user can easily recognize the period during which the user is prompted to take an expiratory action and/or an inspiratory action. For example, as shown in FIGS. 12A through 12C, when the user is prompted to breathe in, it is clear that it is only necessary to breathe in until the second object OBJ2 reaches the top position of the first object OBJ1. Similarly, as shown in FIGS. 13A through 13C, when the user is prompted to breathe out, it is clear that it is only necessary to breathe out until the second object OBJ2 reaches the top position of the first object OBJ1. Thus, at a particular time, the user can recognize how much longer they are to breathe in or breathe out, and therefore can smoothly repeat respiratory actions without losing control of their breathing at the time when the inspiratory action switches to the expiratory action, or without having excess breath at the time when the expiratory action switches to the inspiratory action.

Note that in the examples of the respiratory instruction images, instructions are given to follow two types of periods during which the user is prompted to take an expiratory action and an inspiratory action. Another instruction, however, may be given to follow another type of period during which the user is prompted to take another action. When instructions are given to follow three or more types of periods during which the user is prompted to take respiratory actions, it is possible to give instructions to take respiratory actions with increased precision. For example, FIG. 17 shows an example of a respiratory instruction image indicating a period (breath-hold period) during which the user is prompted to hold their breath.

Figure 17:
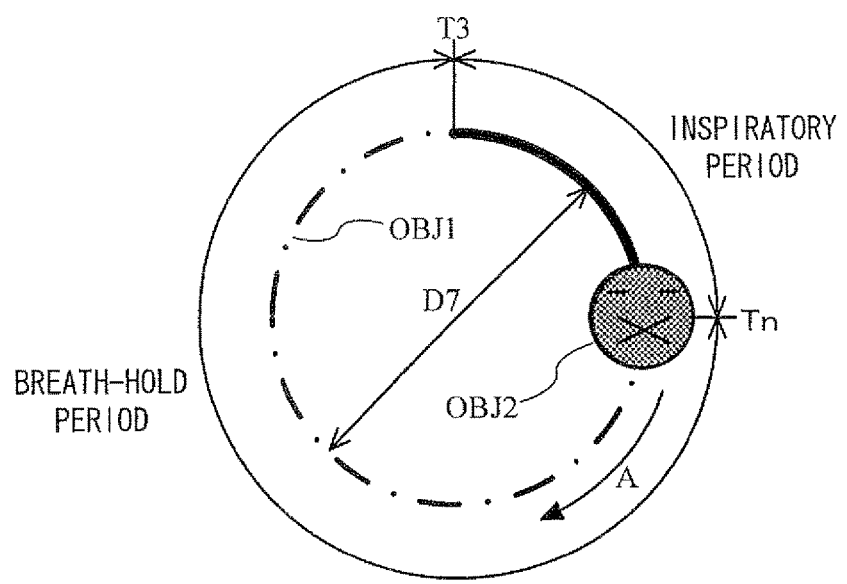
FIG. 17 is a diagram showing an example of a respiratory instruction image displayed on the monitor 2 so as to prompt the user to take a breath-hold action.

Referring to FIG. 17, in the respiratory instruction image indicating the breath-hold period, the second object OBJ2 is represented as a face image with a breath-holding expression, and is displayed in a third color that prompts the user to take a breath-hold action. The second object OBJ2 moves, in a direction A shown in FIG. 17, along the first object OBJ1 displayed in the shape of a circle, and moves in a circular motion with constant angular velocity while completing one full circuit of the circle.

In the example shown in FIG. 17, a state is represented where the second object OBJ2 has moved, in the direction A shown in the figure, from the top position of the circle of the first object OBJ1 to a position about a quarter of the circle. In FIG. 17, the first object OBJ1 is represented by a dashed-dotted line indicating that the period from a present time Tn, which is where the second object OBJ2 is placed, to a time T3 when the second object OBJ2 reaches the top position of the circle of the first object OBJ1 is the breath-hold period, and indicates that the period until the time T3 when the second object OBJ2 reaches the top position in a circular motion with constant angular velocity is the breath-hold period. Further, in FIG. 17, the first object OBJ1 is also represented by a solid line indicating that the period after the time T3 is the inspiratory period, and indicates that the breath-hold period will switch to the inspiratory period at the time (the time T3) when the second object OBJ2 reaches the top position of the circle in a circular motion with constant angular velocity. Thus, by the display form (the line type, the color, and the like) of the first object OBJ1 and the position of the second object OBJ2, the user can easily recognize the period during which the user is prompted to take a breath-hold action.

Here, in the breath-hold period during which the user is prompted to take a breath-hold action, the respiratory instruction image is displayed such that the first object OBJ1 and the second object OBJ2 maintain the same sizes from the beginning to the end of the breath-hold period, and are neither enlarged nor reduced. That is, in the example shown in FIG. 17, the first object OBJ1 is displayed with the diameter of the circle of the first object OBJ1 maintained constant at D7 during the breath-hold period. Thus the display of the first object OBJ1 and the second object OBJ2 at the constant sizes makes it possible to prompt, also visually, the user to hold their breath.

Note that in the above descriptions, the expiratory period and the inspiratory period that the respiratory instruction images instruct the user to follow are changed based on predetermined conditions for change. Other parameters, however, may affect the lengths of the expiratory period and the inspiratory period that the user is instructed to follow. For example, the lengths of the expiratory period and the inspiratory period that the user is instructed to follow may be changed based on, for example, the cycle in which the user is actually breathing.

For example, when the heart rate HR is rising, it is determined that the user is breathing in, and when the heart rate HR is falling, it is determined that the user is breathing out. Thus the calculation of the rise-and-fall cycle (fluctuation cycle) of the heart rate HR of the user makes it possible to calculate the cycle of breathing of the user. Thus the lengths of the expiratory period and the inspiratory period that the user is instructed to follow are changed such that the user is instructed to follow a respiratory cycle obtained by quickening or slowing the calculated respiratory cycle of the user by a predetermined rate (e.g., 20%). This makes it possible to instruct the user to take a respiratory action based on the present respiratory state of the user.

Note that in the above examples, the first object OBJ1 is displayed in the shape of a circle. The first object OBJ1, however, may be an object in another shape. For example, the first object OBJ1 may be an object in a loop shape (an ellipse or a polygon) different from a circle. Further, needless to say, the first object OBJ1 may not necessarily be in a loop shape so long as a path is formed to allow the second object OBJ2 to complete one full circuit thereof, and the first object OBJ1 can also be achieved with objects in various shapes.

Note that in the above descriptions, in the inspiratory period during which the user is prompted to take an inspiratory action, the first object OBJ1 and the second object OBJ2 are gradually enlarged, and in the expiratory period during which the user is prompted to take an expiratory action, the first object OBJ1 and the second object OBJ2 are gradually reduced. However, when displayed, the first object OBJ1 and the second object OBJ2 may change in another transformation, depending on the respiratory action that the user is instructed to take. As a first example, in the inspiratory period during which the user is prompted to take an inspiratory action, only the first object OBJ1 is gradually enlarged, and in the expiratory period during which the user is prompted to take an expiratory action, only the first object OBJ1 is reduced. In this case, the second object OBJ2 moves along the first object OBJ1 without changing its size. As a second example, in the inspiratory period during the user is prompted to take an inspiratory action, the first object OBJ1 and the second object OBJ2 are gradually reduced, and in the expiratory period during which the user is prompted to take an expiratory action, the first object OBJ1 and the second object OBJ2 are gradually enlarged. As a third example, in the inspiratory period during the user is prompted to take an inspiratory action, only the first object OBJ1 is gradually reduced, and in the expiratory period during which the user is prompted to take an expiratory action, only the first object OBJ1 is gradually enlarged. Also in this case, the second object OBJ2 moves along the first object OBJ1 without changing its size.

Note that in the above descriptions, the first object OBJ1 is displayed by distinguishing the inspiratory period and the expiratory period from each other by the display form (e.g., the line type and the color) of the path (circle) for the second object OBJ2 included in the first object OBJ1. The inspiratory period and the expiratory period, however, may not necessarily be distinguished from each other by the display form of the path. In the present invention, in the inspiratory period, at least the first object OBJ1 is provided with one of changes such as enlargement and reduction, and in the expiratory period, the first object OBJ1 is provided with the other one of the changes. Further, in the inspiratory period, the second object OBJ2 is displayed with the breathing-in expression in the first color, and in the expiratory period, the second object OBJ2 is displayed with the breathing-out expression in the second color. Thus the second object OBJ2 moving around along the path: in the expiratory period, completes one full circuit of the path in the time from the beginning to the end of the expiratory period; and in the inspiratory period, completes one full circuit of the path in the time from the beginning to the end of the inspiratory period. Accordingly, even if the display form of the path remains the same, the user can learn, by the change such as the enlargement or the reduction of the first object OBJ1, the change in the display form of the second object OBJ2, or the like, the time when the expiratory period has switched to the inspiratory period and the time when the inspiratory period has switched to the expiratory period. This enables the user to recognize that it is only necessary to breath out or breathe in during the time from the learned time to the time when the second object OBJ2 finishes completing one full circuit of the path. Further, when the position of the second object OBJ2 is fixed (e.g., is fixed such that the periods invariably switch at the top position of the path (circle) of the first object OBJ1) at the time when the expiratory period switches to the inspiratory period and at the time when the inspiratory period switches to the expiratory period, it is possible to easily recognize the lengths of the expiratory period and the inspiratory period even when no distinction is made by the display forms of the path.

Note that in the above descriptions, a part (e.g., the fingertip) of the user's body is irradiated with infrared light, and the biological signal (pulse wave signal) of the user is obtained based on the amount of infrared light transmitted and received through the part of the user's body. That is, a plethysmogram is obtained by detecting a change in volume of the blood vessels, using a so-called optical method. In the present invention, however, the biological signal of the user may be obtained using another type of sensor that obtains physiological information that occurs when the user performs physical activities. For example, a pressure pulse wave may be obtained as the biological signal of the user by detecting (e.g., by a piezoelectric method) a change in pressure in the blood vessels that is caused by the pulsation of the arteries. Alternatively, the muscle potential or the heart potential of the user may be obtained as the biological signal of the user. The muscle potential or the heart potential can be detected by a commonly used method employing electrodes. For example, the biological signal of the user can be obtained based on a minute change in current in the user's body. Yet alternatively, the blood flow of the user may be obtained as the biological signal of the user. The blood flow is measured as a pulsating blood flow per heartbeat, using an electromagnetic method, an ultrasound method, or the like, whereby the pulsating blood flow is obtained as the biological signal of the user. Naturally, a vital sensor may be attached to a part (e.g., the chest, the arm, or the ear lobe) other than the finger of the user in order to obtain the various biological signals described above. To be exact, there may be a difference between the pulse and the heartbeat depending on the obtained biological signal. However, the heart rate and the pulse rate that correspond to the pulse and the heartbeat are considered to be substantially equal to each other, and therefore the obtained biological signal can be processed in a manner similar to that of the processing described above.

Note that in the above descriptions, the game processing and the respiratory instruction processing are performed by the controller 7 (the vital sensor 76 and the core unit 70) and the game apparatus body 5 (i.e., the game apparatus 3). In the respiratory instruction processing, however, at least some of the process steps may be performed by another device. For example, when the game apparatus 3 is configured to communicate with another device (e.g., a server or another game apparatus), the process steps in the game processing and the respiratory instruction processing may be performed by the cooperation of the game apparatus 3 and said another device. As an example, a case is considered where: the expiratory period, the inspiratory period, and the like are set in another device; the game apparatus 3 obtains data representing information about the setting, to thereby perform the respiratory instruction processing; and a respiratory instruction image is indicated to the user. Alternatively, when the virtual game world is set in another device, a case is considered where: the biological signal output from the vital sensor 76 is transmitted to said another device; said another device performs the rest of the game processing; and subsequently, the game apparatus 3 performs a display process. As another example, when the virtual game world is set in another device, a case is considered where: data (e.g., data representing the position of the player character PC) obtained during the game processing is transmitted from the game apparatus 3 to said another device; said another device performs processing using the transmitted data; and subsequently, the game apparatus 3 performs a display process. Thus, when at least some of the process steps in the game processing and the respiratory instruction processing is performed by another device, it is possible to perform processing similar to the game processing and the respiratory instruction processing that are described above, and it is also possible to apply the present invention to game processing (e.g., an online game where the users of a plurality of game apparatuses participate in a game that operates in another device, and share the progression of the game) where the users of a plurality of game apparatuses join a virtual game world achieved in another device, and to respiratory instruction processing where a plurality of users are prompted to follow the same respiratory cycle. The game processing and the respiratory instruction processing that are described above can be performed by a processor or by the cooperation of a plurality of processors, the processor and the plurality of processors included in an information processing system that includes at least one information processing apparatus.

Note that in the above embodiment, the present invention is applied to the stationary game apparatus 3. The present invention, however, is also applicable to any device including at least a vital sensor and an information processing device for performing a process in accordance with the biological signal obtained from the vital sensor. The present invention is applicable to, for example, a commonly used personal computer, a mobile phone, a personal digital assistant (PDA), and a hand-held game apparatus.

Note that in the above descriptions, the core unit 70 and the game apparatus body 5 are connected to each other by wireless communication. The core unit 70 and the game apparatus body 5, however, may be electrically connected to each other via a cable. In this case, a cable connected to the core unit 70 is connected to a connection terminal of the game apparatus body 5.

Note that, of the core unit 70 and the vital sensor 76 constituting the controller 7, only the core unit 70 is provided with the communication section 75. The vital sensor 76, however, may be provided with a communication section that wirelessly transmits biological information data to the game apparatus body 5. Alternatively, the core unit 70 and the vital sensor 76 may each be provided with a communication section. For example, the communication sections provided in the core unit 70 and the vital sensor 76 may each wirelessly transmit biological information data or operation data to the game apparatus body 5. Yet alternatively, the communication section of the vital sensor 76 may wirelessly transmit biological information data to the core unit 70, and the communication section 75 of the core unit 70 may receive the biological information data. Subsequently, the communication section 75 of the core unit 70 may wirelessly transmit, to the game apparatus body 5, operation data of the core unit 70 along with the biological information data of the vital sensor 76. In these cases, the connection cable 79 for electrically connecting the core unit 70 to the vital sensor 76 is no longer required.

Note that the shape of the core unit 70, and the shapes, the number, the arrangement, or the like of the operation sections 72 arranged thereon are merely illustrative, and the present invention can be achieved with other shapes, numbers, arrangements, and the like. Further, the shape of the vital sensor 76, and the types, the numbers, the arrangements, and the like of the components provided therein are also merely illustrative, and the present invention can be achieved with other types, numbers, arrangements, and the like. Furthermore, the coefficients, the criteria, the mathematical formulas, the processing orders, and the like that are used in the processing described above are also merely illustrative, and the present invention can be achieved with other values, mathematical formulas, and processing orders.

Note that the game program (the respiratory instruction program) described above may be supplied to the game apparatus body 5 not only from an external storage medium such as the optical disk 4, but also via a wireless or wired communication line. Further, the game program may be stored in advance in a non-volatile storage device of the game apparatus body 5. Note that examples of the information storage medium having stored thereon the game program may include a flexible disk, a hard disk, a magnetic optical disk, a magnetic tape, a non-volatile memory, and the like, as well as a CD-ROM, a DVD, and any other optical disk storage medium similar to these. Furthermore, as the information storage medium for storing therein the game program, a volatile memory may be used that temporarily stores therein the game program.

While the invention has been described in detail, the foregoing description is in all aspects illustrative and not restrictive. It is understood that numerous other modifications and variations can be devised without departing from the scope of the invention. It is understood that the scope of the invention should be defined only by the appended claims. It is also understood that one skilled in the art can implement the invention in the equivalent range based on the description of the invention and common technical knowledge, from the description of the specific embodiments of the invention. Further, throughout the specification, it should be understood that terms in singular form include the concept of plurality unless otherwise specified. Thus it should be understood that articles or adjectives indicating the singular form (e.g., "a", "an", "the", and the like in English) include the concept of plurality unless otherwise specified. Furthermore, it should be understood that terms used in the present specification have meanings generally used in the art unless otherwise specified. Therefore, unless otherwise defined, all the jargons and technical terms have the same meanings as those generally understood by one skilled in the art of the invention. In the event of any contradiction, the present specification (including meanings defined herein) has priority.

A storage medium having stored thereon a respiratory instruction program, a respiratory instruction apparatus, a respiratory instruction system, and a respiratory instruction processing method, according to the present invention enable a user to easily recognize, for example, the period during which the user is prompted to take an expiratory action and/or an inspiratory action, and therefore are suitable for use as a respiratory instruction program, a respiratory instruction apparatus, a respiratory instruction system, a respiratory instruction processing method, and the like that perform a process of instructing a user to regulate the timing of the user's breathing.

What is claimed is:
1. A computer-readable non-transitory storage medium having stored thereon an information processing program executed by a computer of an information processing apparatus, the information processing program comprising instructions that cause the computer to:
  display, on a display device that is coupled to the computer, a circular breathing object used to instruct exhalation and inhalation for a user viewing the displayed circular breathing object on the display device, the circular breathing object that is displayed having a circumference and a size;
  repeatedly perform a breathing object control process that changes the size of the circular breathing object in a sine curve with respect to time, the breathing object control process including:
    (1) from a minimum size state, a gradual increase in the size of the circular breathing object until a maximum size state is reached, and then
    (2) from the maximum size state, a gradual decrease in the size of the circular breathing object until the minimum size state is reached, wherein the circumference is changed as the size of the circular breathing object is changed;
  locate a timer object at a first position along the circumference of the circular breathing object, wherein the timer object is located at the first position when the circular breathing object is at the minimum size state and the maximum size state;
  concurrently with the gradual increase in the size of the circular breathing object from the minimum size state, move, from the first position, the timer object along the circumference of the circular breathing object at a constant angular velocity, wherein the timer object is synchronized to arrive back at the first position at completion of the gradual increase in the size of the circular breathing object; and
  concurrently with the gradual decrease in the size of the circular breathing object from the maximum size state, move, from the first position, the timer object along the circumference of the circular breathing object, wherein the timer object is synchronized to arrive back at the first position at completion of the gradual decrease in the size of the circular breathing object.

2. The computer-readable non-transitory storage medium having stored thereon the information processing program according to claim 1, wherein a form for the circular breathing object is set based on whether the circular breathing object is being increased or decreased.

3. The computer-readable non-transitory storage medium having stored thereon the information processing program according to claim 2, wherein a color of the circular breathing object is set based on whether the circular breathing object is being increased or decreased.

4. The computer-readable non-transitory storage medium having stored thereon the information processing program according to claim 2, wherein a line type for the circular breathing object is set based on whether the circular breathing object is being increased or decreased.

5. The computer-readable non-transitory storage medium having stored thereon the information processing program according to claim 2, wherein an angular portion of the circular breathing object that is based on a current position of the timer object is to a different display form than a remainder of the circular breathing object.

6. The computer-readable non-transitory storage medium having stored thereon the information processing program according to claim 1, wherein the information processing program further comprises instructions that cause the computer to:
provide a predetermined sign in correspondence with how the circumference of the circular breathing object changes.

7. The computer-readable non-transitory storage medium having stored thereon the information processing program according to claim 1, wherein the information processing program further comprises instructions that cause the computer to:
set a display form of the timer object based on whether the timer object is moved concurrently with the gradual increase or the gradual decrease of the circular breathing object.

8. The computer-readable non-transitory storage medium having stored thereon the information processing program according to claim 7, wherein the display form includes a color for the timer object.

9. An information processing apparatus comprising:
at least one hardware processor that is configured to:
display, on a display device that is coupled to the at least one hardware processor, a circular breathing object used to instruct exhalation and inhalation for a user viewing the displayed circular breathing object on the display device, the circular breathing object that is displayed having a circumference and a size;
repeatedly perform a breathing object control process that changes the size of the circular breathing object in a sine curve with respect to time, the breathing object control process including:
(1) from a minimum size state, a gradual increase in the size of the circular breathing object until a maximum size state is reached, and then
(2) from the maximum size state, a gradual decrease in the size of the circular breathing object until the minimum size state is reached, wherein the circumference is changed as the size of the circular breathing object is changed;
locate a timer object at a first position along the circumference of the circular breathing object, wherein the timer object is located at the first position when the circular breathing object is at the minimum size state and the maximum size state;
concurrently with the gradual increase in the size of the circular breathing object from the minimum size state, move, from the first position, the timer object along the circumference of the circular breathing object at a constant angular velocity, wherein the timer object is synchronized to arrive back at the first position upon finishing the gradual increase in the size of the circular breathing object; and
concurrently with the gradual decrease in the size of the circular breathing object from the maximum size state, move, from the first position, the timer object along the circumference of the circular breathing object, wherein the timer object is synchronized to arrive back at the first position upon finishing the gradual decrease in the size of the circular breathing object.

10. An information processing system that includes a plurality of apparatuses configured to communicate with each other, the information processing system comprising:
a processor that includes hardware circuitry, the processor configured to:
display, on a display device that is coupled to the processor, a circular breathing object used to instruct exhalation and inhalation for a user viewing the displayed circular breathing object on the display device, the circular breathing object that is displayed having a circumference and a size;
repeatedly perform a breathing object control process that changes the size of the circular breathing object in a sine curve with respect to time, the breathing object control process including:
(1) from a minimum size state, a gradual increase in the size of the circular breathing object until a maximum size state is reached, and then
(2) from the maximum size state, a gradual decrease in the size of the circular breathing object until the minimum size state is reached, wherein the circumference is changed as the size of the circular breathing object is changed;
locate a timer object at a first position along the circumference of the circular breathing object, wherein the timer object is located at the first position when the circular breathing object is at the minimum size state and the maximum size state;
concurrently with the gradual increase in the size of the circular breathing object from the minimum size state, move, from the first position, the timer object along the circumference of the circular breathing object at a constant angular velocity, wherein the timer object is synchronized to arrive back at the first position upon completing the gradual increase in the size of the circular breathing object; and
concurrently with the gradual decrease in the size of the circular breathing object from the maximum size state, move, from the first position, the timer object along the circumference of the circular breathing object at the constant angular velocity, wherein the timer object is synchronized to arrive back at the first position upon completing the gradual decrease in the size of the circular breathing object.

11. An information processing method performed by a processor or by cooperation of a plurality of processors, the information processing method comprising:
displaying, on a display device that is coupled to the processor, a circular breathing object used to instruct exhalation and inhalation for a user viewing the displayed circular breathing object on the display device, the circular breathing object having a circumference and a size;

repeatedly performing a breathing object control process that changes the size of the circular breathing object in a sine curve with respect to time, the breathing object control process including:

(1) from a minimum size state, gradually increasing in the size of the circular breathing object until a maximum size state is reached, and then (2) from the maximum size state, gradually decreasing in the size of the circular breathing object until the minimum size state is reached, wherein the circumference is changed as the size of the circular breathing object is changed;

locating a timer object at a first position along the circumference of the circular breathing object, wherein the timer object is located at the first position when the circular breathing object is at the minimum size state and the maximum size state;

concurrently with the gradual increase in the size of the circular breathing object from the minimum size state, moving, from the first position, the timer object along the circumference of the circular breathing object at a constant angular velocity, wherein the timer object is synchronized to arrive back at the first position when the gradual increase in the size of the circular breathing object ends; and concurrently with the gradual decrease in the size of the circular breathing object from the maximum size state, moving, from the first position, the timer object along the circumference of the circular breathing object, wherein the timer object is synchronized to arrive back at the first position when the gradual decrease in the size of the circular breathing object ends.

12. The computer-readable non-transitory storage medium having stored thereon the information processing program according to claim 1, wherein the information processing program further comprises instructions that cause the computer to:

instruct the user to perform a first input during a period when the circular breathing object is being gradually increased; and instruct the user to perform a second input which is different from the first input during a period when the circular breathing object is being gradually decreased.

13. The computer-readable non-transitory storage medium having stored thereon the information processing program according to claim 12, wherein the information processing program further comprises instructions that cause the computer to:

process the first input and the second input that are provided by the user;

determine whether a given input is the first or second input in correspondence with the instruction to perform the first or second input; and provide the user with an advantageous result based on the determination that the given input was correctly provided and a disadvantageous result if the given input was not correctly provided.

14. The information processing apparatus of claim 9, wherein the at least one hardware processor is further configured to:

instruct the user to perform a first input during a period when the circular breathing object is being gradually increased; and instruct the user to perform a second input, which is different from the first input, during a period when the circular breathing object is being gradually decreased.

15. The information processing apparatus of claim 14, wherein the at least one hardware processor is further configured to:

determine whether a given input is the first or second input in correspondence with the instruction to perform the first or second input; and provide the user with an advantageous result based on the determination that the given input was correctly provided and a disadvantageous result if the given input was not correctly provided.

16. The information processing system of claim 10, wherein the processor is further configured to:

instruct the user to perform a first input during a period when the circular breathing object is being gradually increased; and instruct the user to perform a second input which is different from the first input during a period when the circular breathing object is being gradually decreased.

17. The information processing system of claim 16, wherein the processor is further configured to:

identify, as a positive action, an action performed by the user that corresponds to 1) the first input performed while the circular breathing object is being gradually increased; or 2) the second input performed while the circular breathing object is being gradually decreased; and in response to the identification of the positive action, present the user with a reward.

18. The method of claim 11, further comprising prompting the user to perform a first action while the circular breathing object is being gradually increased, and prompting the user to perform a second action, different from the first action, while the circular breathing object is being gradually decreased.

19. The method of claim 18, further comprising:

identifying, as a positive action, an action performed by the user that corresponds to: 1) the first action while the circular breathing object is being gradually increased, or 2) the second action performed while the circular breathing object is being gradually decreased, and in response to the identification of the positive action, presenting the user with a reward.

* * * * *